United States Patent
Lai et al.

(10) Patent No.: US 11,603,426 B2
(45) Date of Patent: Mar. 14, 2023

(54) RESIN COMPOSITION, LIGHT CONVERSION LAYER AND LIGHT EMITTING DEVICE

(71) Applicant: eChem Solutions Corp., Taoyuan (TW)

(72) Inventors: Hsiao-Jen Lai, Taoyuan (TW); Yu-Chun Chen, Taoyuan (TW)

(73) Assignee: eChem Solutions Corp., Taoyuan (TW)

(*) Notice: Subject to any disclaimer, the term of this patent is extended or adjusted under 35 U.S.C. 154(b) by 5 days.

(21) Appl. No.: 17/238,207

(22) Filed: Apr. 23, 2021

(65) Prior Publication Data
US 2021/0363283 A1 Nov. 25, 2021

(30) Foreign Application Priority Data
May 21, 2020 (TW) .................................. 109116862

(51) Int. Cl.
*C08F 283/00* (2006.01)
*C08K 3/32* (2006.01)
(Continued)

(52) U.S. Cl.
CPC ............ *C08F 283/00* (2013.01); *C08K 3/105* (2018.01); *C08K 3/32* (2013.01); *C08K 5/1345* (2013.01);
(Continued)

(58) Field of Classification Search
CPC ......... C08F 283/00; C08K 3/105; C08K 3/32; C08K 5/1345; C08K 5/18; C08K 5/36;
(Continued)

(56) References Cited

U.S. PATENT DOCUMENTS

2013/0222738 A1* 8/2013 Hsieh ................ G02F 1/133514
349/69
2016/0139309 A1* 5/2016 Hsu .................... C08G 59/3245
252/586
(Continued)

FOREIGN PATENT DOCUMENTS

CN 105652594 6/2016
CN 109415536 3/2019
(Continued)

OTHER PUBLICATIONS

"Office Action of Taiwan Counterpart Application", dated Mar. 29, 2021, p. 1-p. 9.

*Primary Examiner* — Bao Q Truong
(74) *Attorney, Agent, or Firm* — JCIPRNET

(57) ABSTRACT

A resin composition, a light conversion layer and a light emitting device are provided. The resin composition includes a quantum dot (A), an alkali-soluble resin (B), an ethylenically unsaturated monomer (C), a photoinitiator (D), a solvent (E) and a phenyl-based compound (F). The phenyl-based compound (F) includes at least one of a compound represented by following Formula (F-1) and a compound represented by following Formula (F-2). Based on a total usage amount of the resin composition as 100 parts by weight, a usage amount of the phenyl-based compound (F) is 0.05 to 5 parts by weight.

Formula (F-1)

(Continued)

-continued

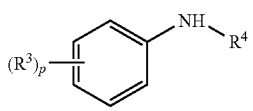

Formula (F-2)

In Formula (F-1) and Formula (F-2), the definition of $R^1$, $R^3$, $R^4$, Y, Z, m, n and p are the same as defined in the detailed description.

13 Claims, 2 Drawing Sheets

(51) Int. Cl.
| | |
|---|---|
| *C08K 3/105* | (2018.01) |
| *C08K 5/134* | (2006.01) |
| *C08K 5/18* | (2006.01) |
| *C08K 5/524* | (2006.01) |
| *G02F 1/1335* | (2006.01) |
| *C08K 5/36* | (2006.01) |
| *B82Y 20/00* | (2011.01) |

(52) U.S. Cl.
CPC .................. *C08K 5/18* (2013.01); *C08K 5/36* (2013.01); *C08K 5/524* (2013.01); *G02F 1/133614* (2021.01); *B82Y 20/00* (2013.01); *G02F 2202/36* (2013.01)

(58) Field of Classification Search
CPC ............... C08K 5/524; G02F 1/133614; G02F 2202/36; G02F 1/133609; B82Y 20/00; F21V 9/00; F21V 9/30; F21V 9/38; F21K 2/06; F21K 2/00; F21K 9/64
See application file for complete search history.

(56) References Cited

U.S. PATENT DOCUMENTS

| | | | |
|---|---|---|---|
| 2018/0237690 A1* | 8/2018 | Chung | .................. G03F 7/033 |
| 2019/0185743 A1* | 6/2019 | Kim | .................. H01L 51/5284 |

FOREIGN PATENT DOCUMENTS

| | | |
|---|---|---|
| TW | 201710399 | 3/2017 |
| TW | I621915 | 4/2018 |
| TW | 201925356 | 7/2019 |
| TW | I665517 | 7/2019 |
| TW | 201938765 | 10/2019 |

\* cited by examiner

RESIN COMPOSITION, LIGHT CONVERSION LAYER AND LIGHT EMITTING DEVICE

CROSS-REFERENCE TO RELATED APPLICATION

This application claims the priority benefit of Taiwan application no. 109116862, filed on May 21, 2020. The entirety of the above-mentioned patent application is hereby incorporated by reference herein and made a part of this specification.

BACKGROUND

Technical Field

The invention relates to a resin composition, and more particularly, to a resin composition, a light conversion layer and a light emitting device suitable for a light conversion layer.

Description of Related Art

With the development of display device techniques, in order to improve the display quality of a display device, a light conversion layer including quantum dots is disposed in display devices in recent years to improve the brightness and color purity of the display screen. However, the currently used quantum dots-containing resin composition for manufacturing a light conversion layer has the phenomenon of poor storage stability at room temperature, thereby affecting the stability of the light conversion layer manufactured thereof and the performance of devices using the light conversion layer.

SUMMARY

Accordingly, the invention provides a resin composition, a light conversion layer formed by the resin composition, and a light emitting device including the light conversion layer, wherein the resin composition has characteristics such as good viscosity stability, patterning ability, resolution, and pattern stability.

A resin composition of the invention includes a quantum dot (A), an alkali-soluble resin (B), an ethylenically unsaturated monomer (C), a photoinitiator (D), a solvent (E) and a phenyl-based compound (F). The phenyl-based compound (F) includes at least one of a compound represented by following Formula (F-1) and a compound represented by following Formula (F-2),

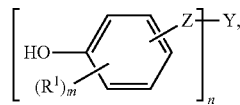

Formula (F-1)

in Formula (F-1), $R^1$ is an alkyl group, m is an integer of 0 to 3,

Z is an alkylene group,

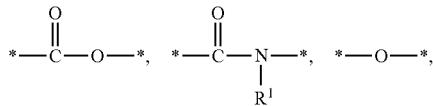

or a combination thereof, $R^2$ is a hydrogen or an alkyl group, when n is 1, Y is a hydrogen or an alkyl group, when n is 2, Y is a single bond, an alkylene group, S,

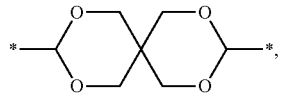

or a combination thereof, when n is 3, Y is a single bond, a trivalent alkyl group, a trivalent phenyl group,

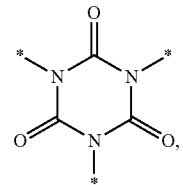 [SMILES: *n1c(=O)n(*)c(=O)n(*)c1=O]

or a combination thereof, when n is 4, Y is a carbon,

* indicates a bonding position;

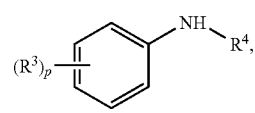

Formula (F-2)

in Formula (F-2), $R^3$ is an alkyl group, $R^4$ is a hydrogen or a phenyl group, p is 0 or 1, and based on a total usage amount of 100 parts by weight of the resin composition, a usage amount of the phenyl-based compound (F) is 0.05 part by weight to 5 parts by weight.

In an embodiment of the invention, the quantum dot (A) includes at least one selected from the group consisting of green quantum dots and red quantum dots. A light emission wavelength of the green quantum dots is in the range of greater than or equal to 500 nm to less than 600 nm. A light emission wavelength of the red quantum dots is in the range of greater than or equal to 600 nm to less than or equal to 800 nm.

In an embodiment of the invention, the phenyl-based compound (F) includes at least one selected from the group consisting of following compounds:

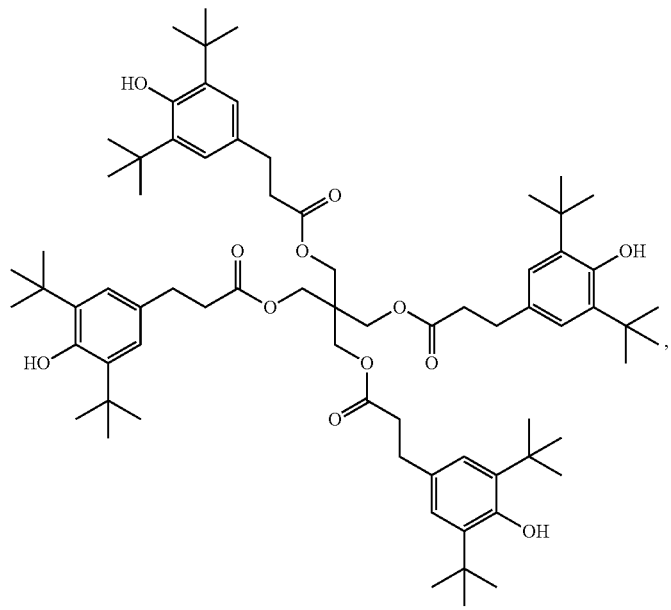
Formula (f-1)
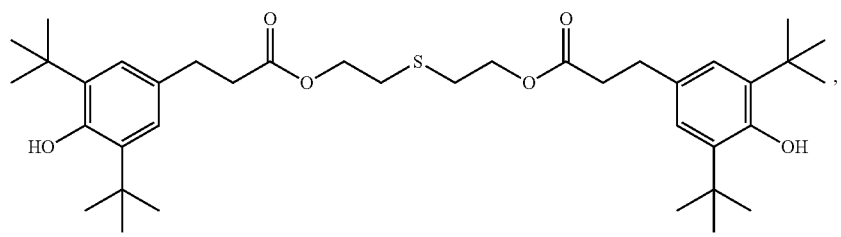
Formula (f-2)
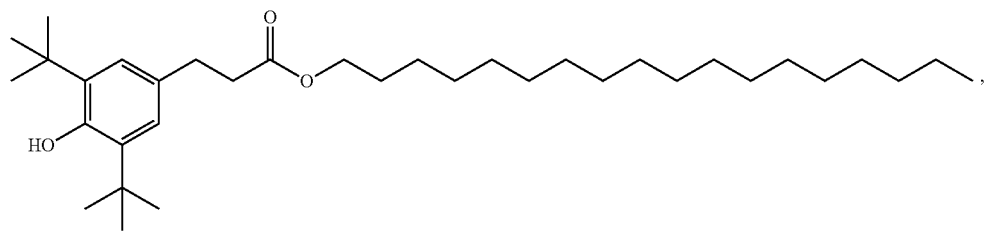
Formula (f-3)
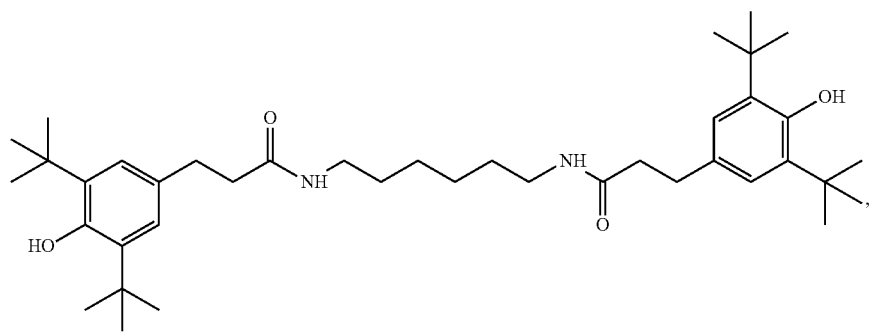
Formula (f-4)

Formula (f-5)
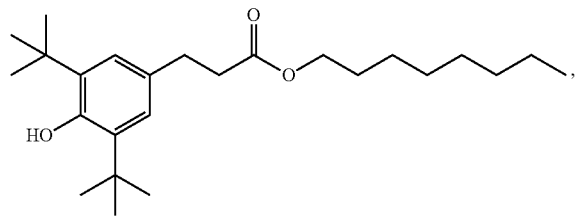
Formula (f-6)
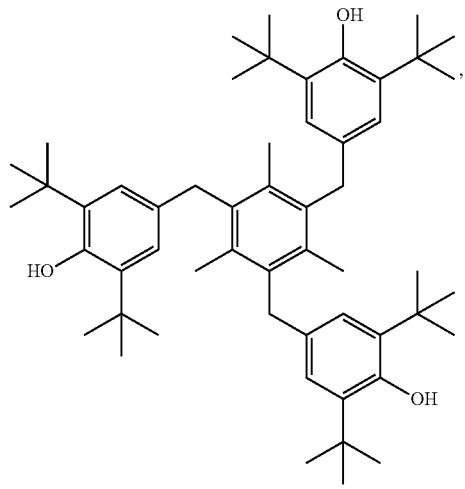
Formula (f-7)
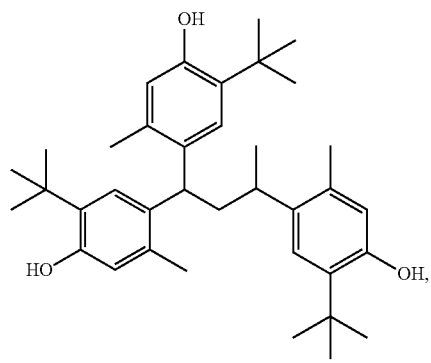
Formula (f-8)
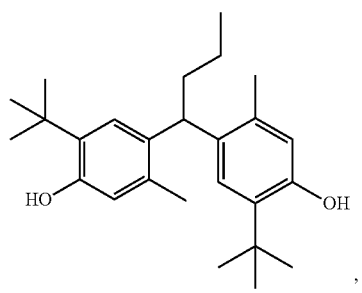
Formula (f-9)
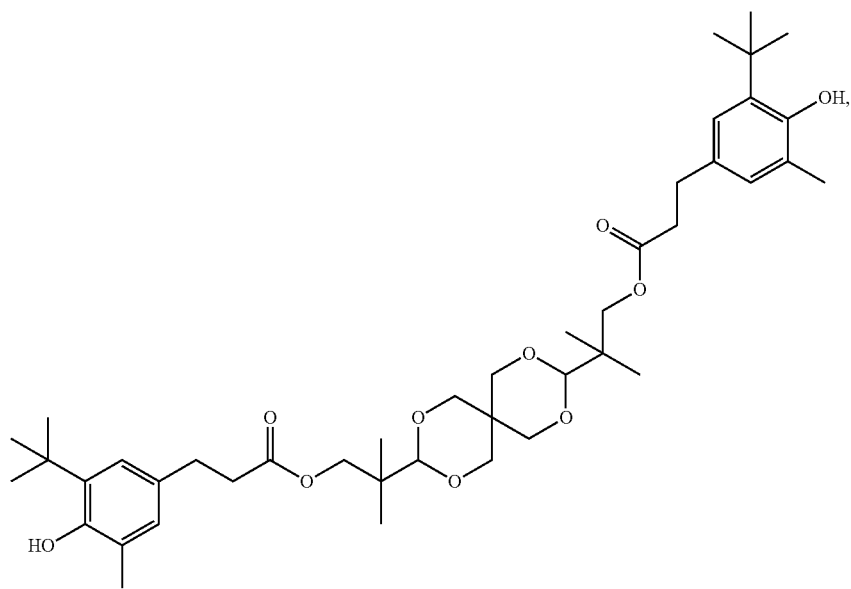

Formula (f-10)
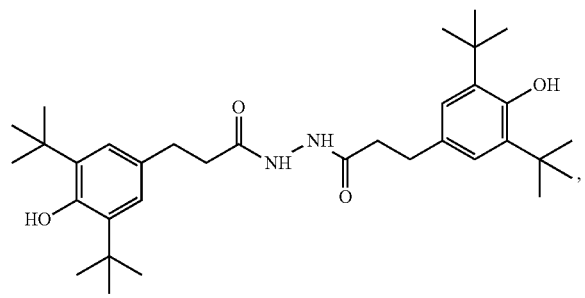
Formula (f-11)
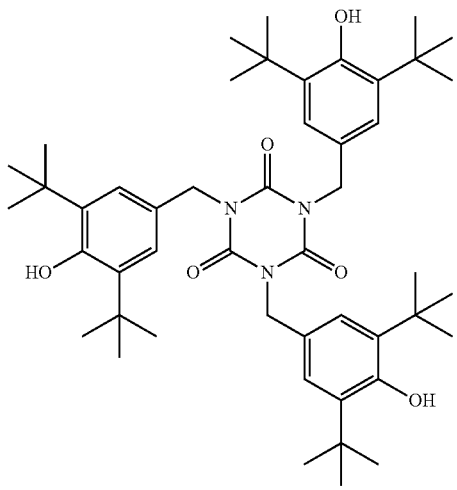
Formula (f-12)
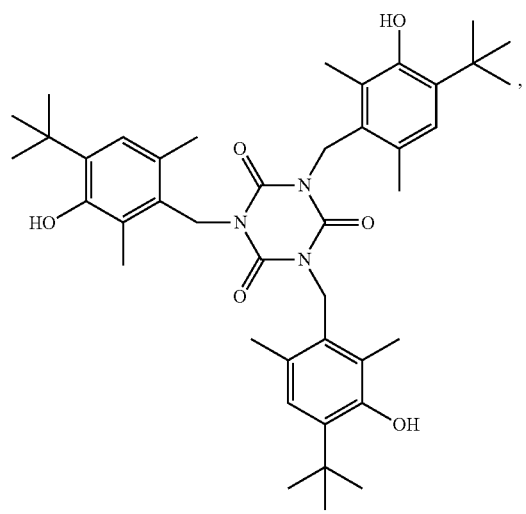
Formula (f-13)
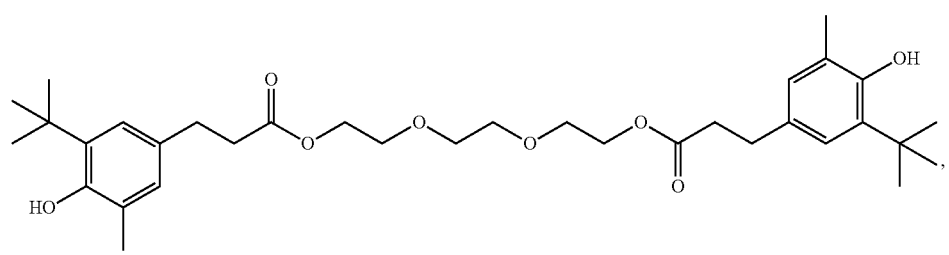
Formula (f-14)
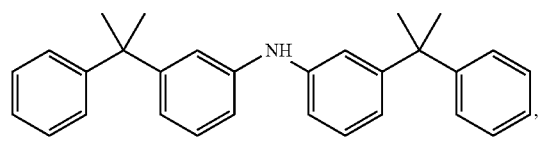
Formula (f-15)
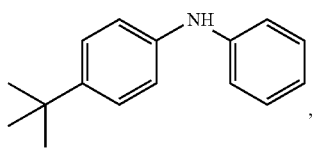
Formula (f-16)
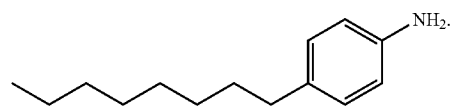

In an embodiment of the invention, the resin composition further includes a scatterer (G). Based on a total usage amount of 100 parts by weight of the resin composition, a usage amount of the scatterer (G) is 0.1 part by weight to 10 parts by weight.

In an embodiment of the invention, the resin composition further includes a scatterer (G). The scatterer (G) includes at least one selected from the group consisting of titanium dioxide, silicon dioxide, barium titanate, zirconium oxide, zinc oxide and aluminum oxide.

In an embodiment of the invention, based on a total usage amount of 100 parts by weight of the resin composition, a usage amount of the quantum dot (A) is 0.5 part by weight to 15 parts by weight, a usage amount of the alkali-soluble resin (B) is 0.5 part by weight to 20 parts by weight, a usage amount of the ethylenically unsaturated monomer (C) is 0.5 part by weight to 20 parts by weight, and a usage amount of the photoinitiator (D) is 0.01 part by weight to 5 parts by weight.

In an embodiment of the invention, based on a total usage amount of 100 parts by weight of the resin composition, a usage amount of the solvent (E) is 65 parts by weight to 85 parts by weight.

A light conversion layer of the invention is formed by the resin composition above.

In an embodiment of the invention, the light conversion layer further includes a red pattern layer, a green pattern layer and a scatterer pattern layer. The red pattern layer includes red quantum dots. The green pattern layer includes green quantum dots. The scatterer pattern layer does not include quantum dots.

In an embodiment of the invention, a light emission wavelength of the green quantum dots is in the range of greater than or equal to 500 nm to less than 600 nm. A light emission wavelength of the red quantum dots is in the range of greater than or equal to 600 nm to less than or equal to 800 nm.

A light emitting device of the invention includes the light conversion layer above.

In an embodiment of the invention, the light emitting device further includes a substrate and a backlight module. The light conversion layer is located on the substrate. The backlight module is disposed on a side of the substrate where the light conversion layer is disposed.

In an embodiment of the invention, the light emitting device further includes a filter layer. The filter layer is located between the substrate and the light conversion layer. The filter layer includes a red filter pattern, a green filter pattern and a blue filter pattern. The red filter pattern, the green filter pattern and the blue filter pattern do not include quantum dots.

Based on the above, the resin composition of the invention uses the phenyl-based compound (F) having specific structure, and based on a total usage amount of 100 parts by weight of the resin composition, a usage amount of the phenyl-based compound (F) is 0.05 part by weight to 5 parts by weight. Thus, the resin composition may have good viscosity stability and patterning ability, and when the resin composition is used to form the light conversion layer, the light conversion layer may have good resolution and pattern stability, thereby suitable for a light emitting device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
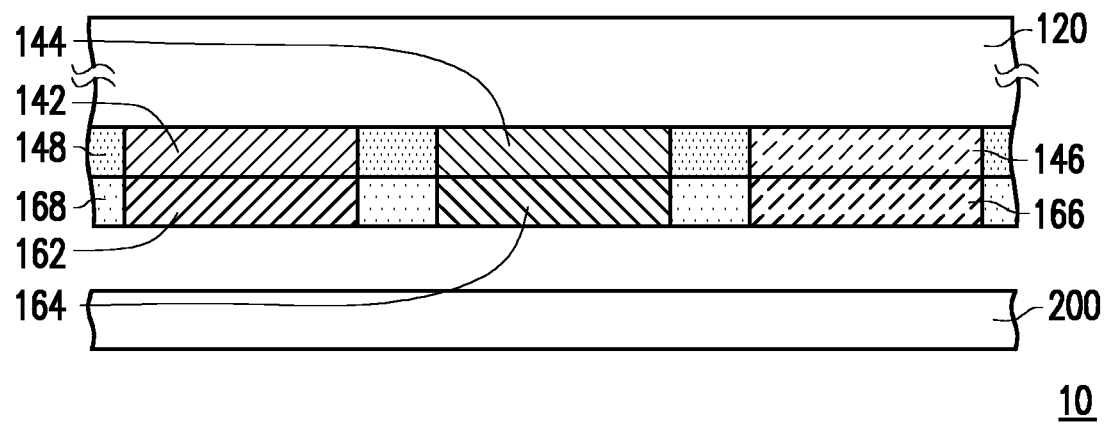
FIG. 1 is a schematic diagram of a light emitting device according to an embodiment of the invention.

A description accompanied with drawings is provided in the following to comprehensively explain exemplary embodiments of the disclosure. As those skilled in the art would realize, the described embodiments may be modified in various different ways, all without departing from the spirit or scope of the present invention. For clarity of the drawings, the thicknesses of each layer, film, panel, region and the like are enlarged. The same reference numerals denote the same elements throughout the specification.

<Resin Composition>

The invention provides a resin composition, including a quantum dot (A), an alkali-soluble resin (B), an ethylenically unsaturated monomer (C), a photoinitiator (D), a solvent (E) and a phenyl-based compound (F). In addition, the resin composition of the invention may further include a scatterer (G) and an additive (H) such as a leveling agent as needed. Hereinafter, the various components above are described in detail.

It should be mentioned that, in the following, (meth) acrylic acid represents acrylic acid and/or methacrylic acid, and (meth)acrylate represents acrylate and/or methacrylate.

Quantum Dot (A)

In the present embodiment, the quantum dot (A) may include at least one selected from the group consisting of green quantum dots and red quantum dots. The green quantum dots and the red quantum dots may emit green light and red light after energy conversion by absorbing a light (e.g. blue light) emitted by a backlight module, respectively. A light emission wavelength of the green quantum dots may be in the range of greater than or equal to about 500 nm to less than about 600 nm. A light emission wavelength of the red quantum dots may be in the range of greater than or equal to about 600 nm to less than or equal to about 800 nm. In the present embodiment, a light emission wavelength of the quantum dot may be adjusted as needed, such as the intended use of the light emission device including the light conversion layer formed by the resin composition.

For example, the quantum dots (A) may include quantum dots composed of group II-VI elements, quantum dots composed of group III-V elements, or other suitable quantum dots. The quantum dots may be single-layer structural quantum dots or multi-layer structural quantum dots. The multi-layer structural quantum dots may have shell-core structure.

The quantum dots composed of group II-VI elements are not particularly limited, and suitable quantum dots composed of group II-VI elements may be selected according to needs. For example, the quantum dots composed of group II-VI elements may include CdS, CdSe, CdTe, ZnS, ZnSe, HgS, or other suitable quantum dots. The quantum dots composed of group II-VI elements may be used alone or in combination.

The quantum dots composed of group III-V elements are not particularly limited, and suitable quantum dots composed of group III-V elements may be selected according to needs.

For example, the quantum dots composed of group III-V elements may include InP, InAs, or other suitable quantum dots. The quantum dots composed of group III-V elements may be used alone or in combination.

Based on a total usage amount of 100 parts by weight of the resin composition, a usage amount of the quantum dot (A) is 0.5 part by weight to 15 parts by weight.

Alkali-Soluble Resin (B)

The alkali-soluble resin (B) is not particularly limited, and suitable alkali-soluble resin may be selected according to needs. In the present embodiment, the alkali-soluble resin (B) may be a (meth)acrylic acid-based resin. For example, the alkali-soluble resin (B) may be formed by (meth)acrylic acid, alkyl (meth)acrylate, hydroxyl-containing (meth)acrylate, ether-containing (meth)acrylate, alicyclic (meth)acrylate, or other suitable monomers. The alkali-soluble resin (B) may be formed by a single monomer or may be formed by a plurality of monomers.

Alkyl (meth)acrylate may include methyl (meth)acrylate, ethyl (meth)acrylate, propyl (meth)acrylate, butyl (meth)acrylate, tert-butyl (meth)acrylate, benzyl (meth)acrylate, lauryl (meth)acrylate or other suitable alkyl (meth)acrylates.

Hydroxyl-containing (meth)acrylate may include hydroxyethyl (meth)acrylate, hydroxypropyl (meth)acrylate or other suitable hydroxyl-containing (meth)acrylates.

Ether-containing (meth)acrylate may include ethoxyethyl (meth)acrylate, glycidyl (meth)acrylate or other suitable ether-containing (meth)acrylates.

Alicyclic (meth)acrylate may include cyclohexyl (meth)acrylate, isophorone (meth)acrylate, dicyclopentadienyl (meth)acrylate or other suitable alicyclic (meth)acrylates.

For example, the alkali-soluble resin (B) may be used alone or in combination. For example, the alkali-soluble resin (B) may be the following alkali-soluble resin (B-1), the following alkali-soluble resin (B-2) or a combination thereof.

The structural units contained in the alkali-soluble resin (B-1) are a structural unit represented by Formula (b-1), a structural unit represented by Formula (b-2) and a structural unit represented by Formula (b-3). In addition, the structural units contained in the alkali-soluble resin (B-2) are a structural unit represented by Formula (b-2), a structural unit represented by Formula (b-4), a structural unit represented by Formula (b-5) and a structural unit represented by Formula (b-6). In the present embodiment, a weight average molecular weight of the alkali-soluble resin (B-1) may be 13500 to 16500, a weight average molecular weight of the alkali-soluble resin (B-2) may be 11000 to 14000, but not limited thereto.

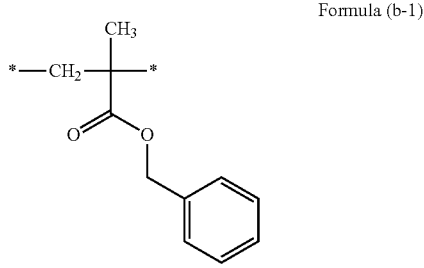

Formula (b-1)

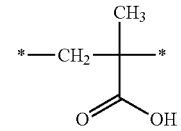

Formula (b-2)

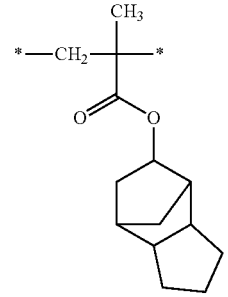

Formula (b-3)

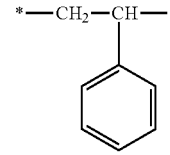

Formula (b-4)

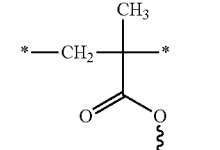

Formula (b-5)

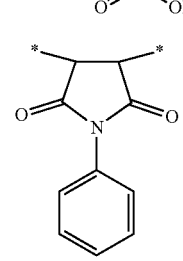

Formula (b-6)

In the structural units represented by Formula (b-1) to Formula (b-6), * indicates a bonding position;

in the structural unit represented by Formula (b-5), ⁞ indicates an alkyl group with 1 to 10 carbons.

Based on a total usage amount of 100 parts by weight of the resin composition, a usage amount of the alkali-soluble resin (B) is 0.5 part by weight to 20 parts by weight.

When the resin composition includes the alkali-soluble resin (B), the resin composition may have good patterning ability, such that the resulting light conversion layer may have good resolution.

Ethylenically Unsaturated Monomer (C)

The ethylenically unsaturated monomer (C) is not particularly limited, and suitable ethylenically unsaturated monomer may be selected according to needs. In the present embodiment, the ethylenically unsaturated monomer (C) include at least one ethylenically unsaturated group. The ethylenically unsaturated monomer (C) may include at least one selected from a group consisting of a monofunctional group monomer, a bifunctional group monomer and a multifunction group monomer, wherein the multifunction group monomer refers to an ethylenically unsaturated monomer having three or more ethylenically unsaturated groups, preferably multifunction group monomer.

For example, the ethylenically unsaturated monomer (C) may include isobornyl methacrylate, 2-phenoxyethyl acrylate, ethoxyethoxyethyl acrylate, tricyclodecane dimethanol diacrylate, 1,6-hexanediol diacrylic acid, ethylene glycol dimethacrylate, pentaerythritol triacrylate, ethoxylated pentaerythritol tetraacrylate, pentaerythritol hexaacrylate, or other suitable monomers, preferably pentaerythritol hexaacrylate. The ethylenically unsaturated monomer (C) may be used alone or in combination of a plurality of monomers.

Based on a total usage amount of 100 parts by weight of the resin composition, a usage amount of the ethylenically unsaturated monomer (C) is 0.5 part by weight to 20 parts by weight.

When the resin composition includes the ethylenically unsaturated monomer (C), the resin composition may have good patterning ability, such that the resulting light conversion layer may have good resolution.

Photoinitiator (D)

The photoinitiator (D) includes at least one selected from the group consisting of a triazine-based compound, an acetophenone-based compound, a diphenyl ketone-based compound, a diimidazole-based compound, a thioxanthone-based compound, a quinone-based compound, an acylphosphine oxide and an acyl oxime-based compound, preferably including at least one selected from the group consisting of an acyl oxime-based compound and an acetophenone-based compound. However, the invention is not limited thereto, and the photoinitiator (D) may include other suitable photoinitiators.

The triazine-based compound may include chemcure-PAG-1 (product name; produced by Chembridge International Corp, Ltd.), chemcure-PAG-2 (product name; produced by Chembridge International Corp, Ltd.) or other suitable triazine-based compounds. The triazine-based compound may be used alone or in combination.

The acetophenone-based compound may include Irgacure 907, 369E (product name; produced by BASF), chemcure-96 (product name; produced by Chembridge International Corp, Ltd.) or other suitable acetophenone-based compounds. The acetophenone-based compound may be used alone or in combination.

The diphenyl ketone-based compound may include chemcure-BP, chemcure-64 (product name; produced by Chembridge International Corp, Ltd.) or other suitable diphenyl ketone-based compounds. The diphenyl ketone-based compound may be used alone or in combination.

The diimidazole-based compound may include Chemcure-BCIM, Chemcure-TCDM (product name; produced by Chembridge International Corp, Ltd.) or other suitable diimidazole-based compounds. The diimidazole-based compound may be used alone or in combination.

The thioxanthone-based compound may include Irgacure ITX (product name; produced by BASF) or other suitable thioxanthone-based compounds. The thioxanthone-based compound may be used alone or in combination.

The quinone-based compound may select suitable quinone-based compounds. The quinone-based compound may be used alone or in combination.

The acylphosphine oxide may include Irgacure TPO, Irgacure 819 (product name; produced by BASF) or other suitable acylphosphine oxides. The acylphosphine oxide may be used alone or in combination.

The acyl oxime-based compound may include Irgacure OXE-01, OXE-02, OXE-03, OXE-04 (product name; produced by BASF) or other suitable acyl oxime-based compounds. The acyl oxime-based compound may be used alone or in combination.

Based on a total usage amount of 100 parts by weight of the resin composition, a usage amount of the photoinitiator (D) is 0.01 part by weight to 5 parts by weight.

When the resin composition includes the photoinitiator (D), the resin composition may have good patterning ability, such that the resulting light conversion layer may have good resolution.

Solvent (E)

The solvent (E) is not particularly limited, and suitable solvent may be selected according to needs. For example, the solvent (E) may include 1,2,3-trichloropropane, 1,3-butanediol, benzyl alcohol, 1,3-butanediol diacetate, 1,4-dioxane, 2-heptanone, 2-methyl-1,3-propanediol, cyclohexanone, 3-methoxybutanol, 3-methoxybutyl acetate, 4-heptanone, m-xylene, m-diethylbenzene, m-dichlorobenzene, N,N-dimethylacetamide, n-butylbenzene, n-propyl acetate, N-methylpyrrolidone, o-xylene, p-diethylbenzene, o-dichlorobenzene, p-chlorotoluene, isophorone, ethylene glycol diethyl ether, ethylene glycol dibutyl ether, ethylene glycol methyl ether acetate, ethylene glycol ether acetate, diisobutyl ketone, cyclohexanol acetate, dipropylene glycol dimethyl ether, dipropylene glycol monomethyl ether acetate, propylene glycol monomethyl ether acetate, propylene glycol monoethyl ether acetate, propylene glycol monopropyl ether, methyl isobutyl ketone, methyl cyclohexanol, or other suitable solvents. The solvent may be used alone or in combination.

Based on a total usage amount of 100 parts by weight of the resin composition, a usage amount of the solvent (E) is 65 parts by weight to 85 parts by weight.

When the resin composition includes the solvent (E), the resin composition may have appropriate viscosity, such that the resulting light conversion layer may have good coating uniformity.

Phenyl-Based Compound (F)

The phenyl-based compound (F) includes at least one of a compound represented by following Formula (F-1) and a compound represented by following Formula (F-2). The phenyl-based compound (F) may be used alone or in combination of a plurality of compounds.

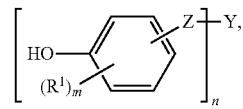

Formula (F-1)

in Formula (F-1), $R^1$ is an alkyl group, m is an integer of 0 to 3,

Z is an alkylene group,

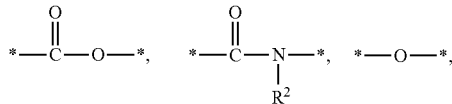

or a combination thereof, $R^2$ is a hydrogen or an alkyl group, when n is 1, Y is a hydrogen or an alkyl group, when n is 2, Y is a single bond, an alkylene group, S,

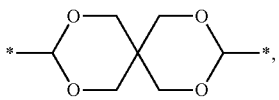

or a combination thereof, when n is 3, Y is a single bond, a trivalent alkyl group, a trivalent phenyl group,

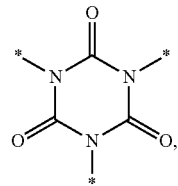 [SMILES: *n1c(=O)n(*)c(=O)n(*)c1=O]

or a combination thereof, when n is 4, Y is a carbon,

* indicates a bonding position.

In Formula (F-1), $R^1$ is preferably an alkyl group with 1 to 5 carbons, and more preferably a methyl group or a tert-butyl group; m is preferably 2 or 3; Z is preferably an alkylene group with 1 to 18 carbons,

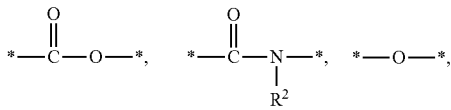

or a combination thereof; $R^2$ is preferably a hydrogen.

In Formula (F-1), when n is 1, Y is preferably a hydrogen or an alkyl group with 1 to 17 carbons. For example, when n is 1 and Z is a methylene group (—$CH_2$—), Y is preferably an alkyl group with 1 to 17 carbons; or when n is 1 and Y is a hydrogen, Z is preferably an alkylene group with 1 to 18 carbons.

In Formula (F-1), when n is 2 and Y is an alkylene group, Y is preferably an alkylene group with 4 to 6 carbons, more preferably a hexylene group or a butylene group.

In Formula (F-1), when n is 3 and Y is a trivalent alkyl group, Y is preferably a trivalent alkyl group with 4 to 6 carbons, more preferably a trivalent hexylene group or a trivalent butylene group; when n is 3 and Y is a trivalent phenyl group, Y is preferably an alkyl-substituted trivalent phenyl group, more preferably a methyl-substituted trivalent phenyl group.

Preferred specific examples of the compound represented by Formula (F-1) include compounds represented by following Formula (f-1) to Formula (f-13). The compounds represented by Formula (f-1) to Formula (f-13) may be purchased from, for example, BASF or ADEKA corporation. The compound represented by Formula (F-1) may be used alone or in combination of a plurality of compounds.

Formula (f-1)

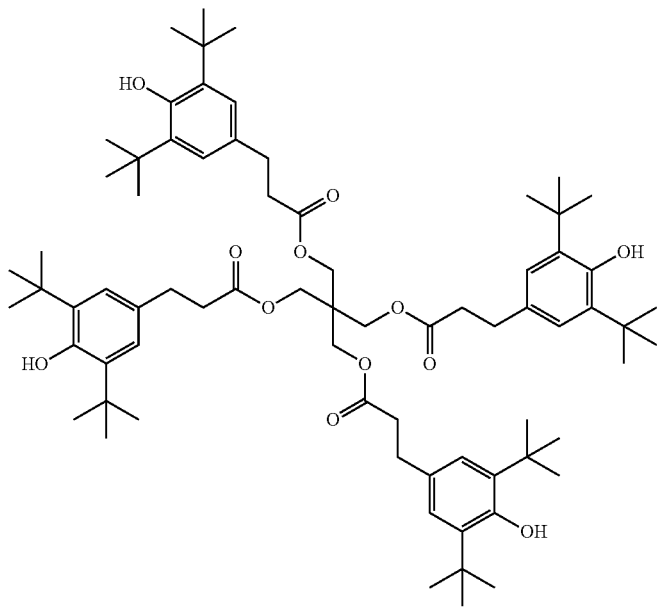

Formula (f-2)
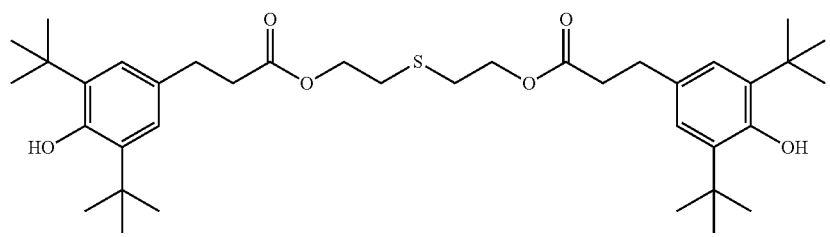
Formula (f-3)
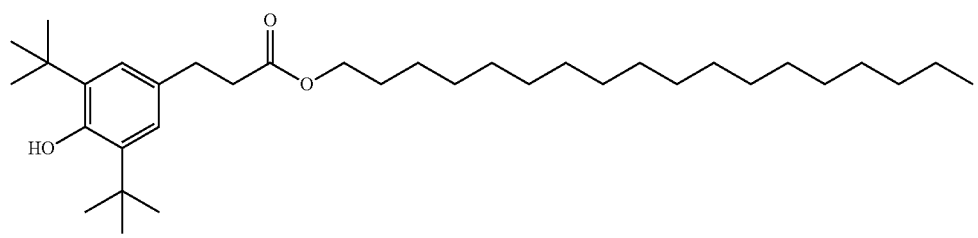
Formula (f-4)
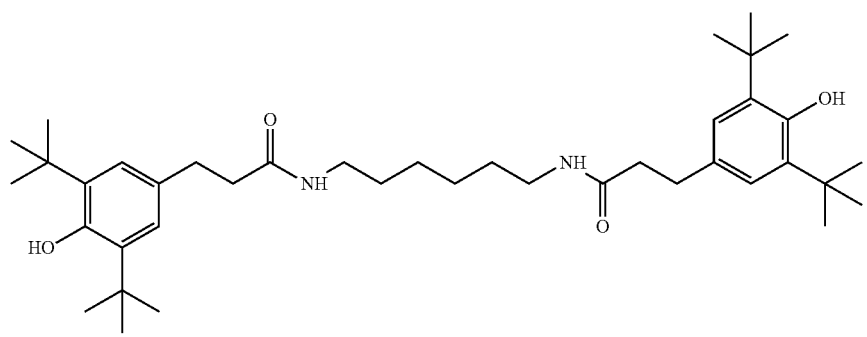
Formula (f-5)
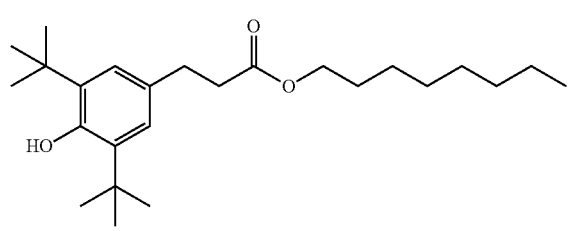
Formula (f-6)
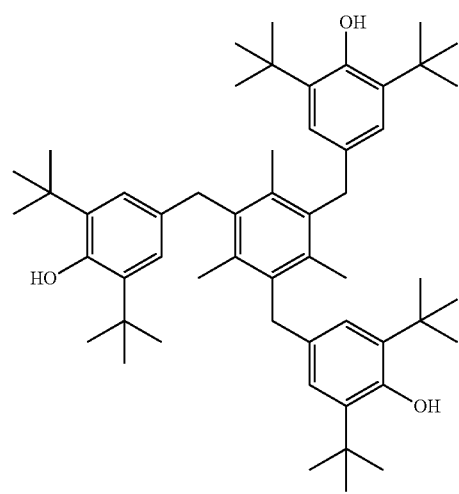

-continued
Formula (f-7)
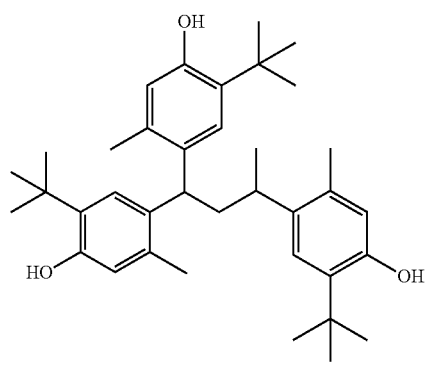
Formula (f-8)
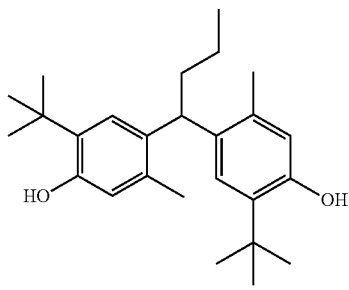
Formula (f-9)
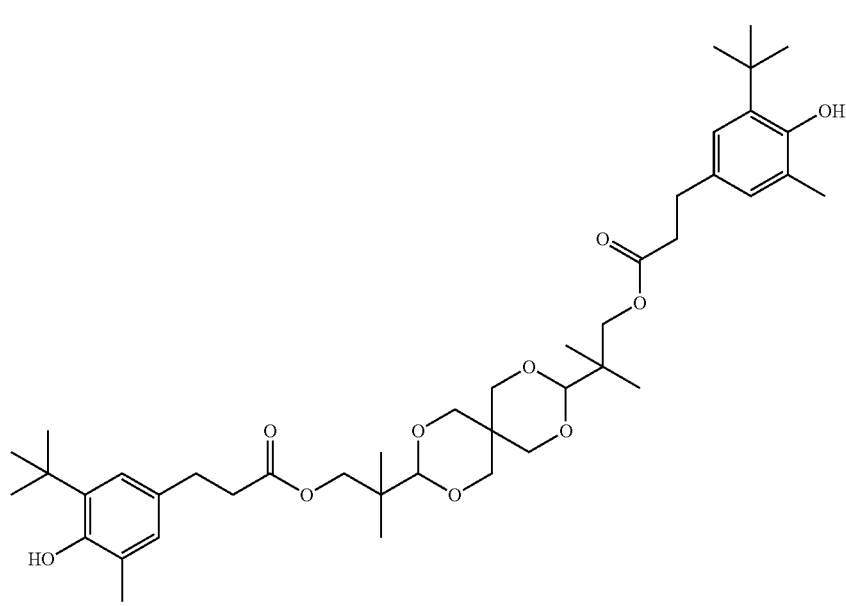
Formula (f-10)
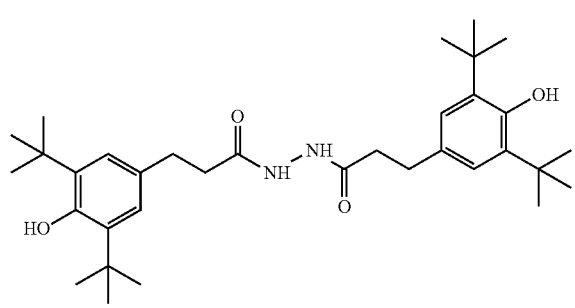
Formula (f-11)
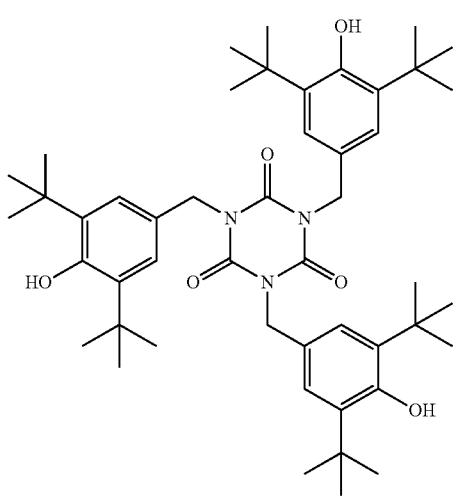

Formula (f-12)

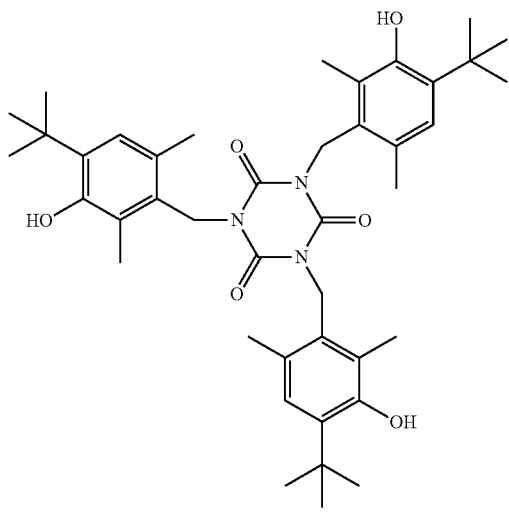

Formula (f-13)

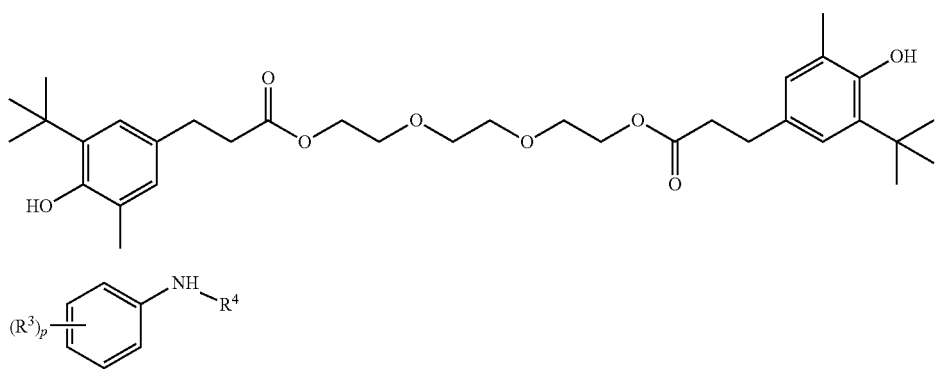

Formula (F-2)

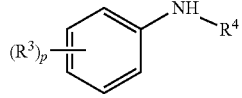

In Formula (F-2), $R^3$ is an alkyl group, $R^4$ is a hydrogen or a phenyl group, p is 0 or 1.

In Formula (F-2), $R^3$ is preferably an unsubstituted or phenyl-substituted alkyl group, more preferably an unsubstituted or phenyl-substituted alkyl group with 3 to 8 carbons; $R^4$ is preferably a hydrogen, an unsubstituted phenyl group, an alkyl-substituted phenyl group or a phenylalkyl-substituted phenyl group, more preferably a hydrogen, an unsubstituted phenyl group, a butyl phenyl group or a phenylpropyl-substituted phenyl group. Preferred specific examples of the compound represented by Formula (F-2) include compounds represented by following Formula (f-14) to Formula (f-16). The compounds represented by Formula (f-14) to Formula (f-16) may be purchased from, for example, Double Bond Chemical Ind. Co., Ltd.

The compound represented by Formula (F-2) may be used alone or in combination of a plurality of compounds.

Formula (f-14)

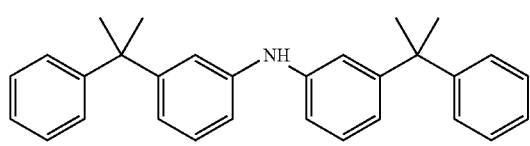

Formula (f-15)

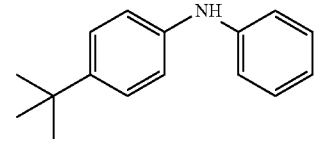

Formula (f-16)

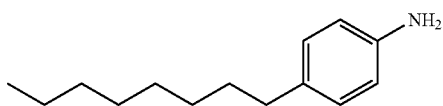

The phenyl-based compound (F) is preferably at least one selected from the group consisting of the compounds represented by the above Formula (f-1) to Formula (f-16).

Based on a total usage amount of 100 parts by weight of the resin composition, a usage amount of the phenyl-based compound (F) is 0.05 part by weight to 5 parts by weight, preferably 0.1 part by weight to 4 parts by weight, more preferably 0.5 part by weight to 3 parts by weight.

When the phenyl-based compound (F) in the resin composition includes at least one of the compound represented by Formula (F-1) and the compound represented by Formula (F-2), the hydroxyl group (—OH) and/or the amine group (—NH—) in the compound represented by Formula (F-1) and/or the compound represented by Formula (F-2) react with the free radicals generated by the photoinitiator in the resin composition to reduce the reaction of the free radicals with other components in the resin composition, thereby obtaining a resin composition having good viscosity stability. At the same time, when the usage amount of the phenyl-based compound (F) is within the above range, the resin composition may have good viscosity stability and patterning ability, and the resulting light conversion layer may have good resolution and pattern stability.

Scatterer (G)

The resin composition may further include a scatterer (G). In the present embodiment, the scatterer (G) may include at least one selected from the group consisting of titanium dioxide, silicon dioxide, barium titanate, zirconium oxide, zinc oxide and aluminum oxide. The scatterer (G) may be used alone or in combination.

Based on a total usage amount of 100 parts by weight of the resin composition, a usage amount of the scatterer (G) is 0.1 part by weight to 10 parts by weight.

When the resin composition further includes the scatterer (G), the scatterer (G) may reflect the light (e.g. blue light) which is not absorbed by the quantum dot (A) to increase the possibility of light being absorbed by quantum dots, thereby promoting a light absorptivity and a light conversion efficiency of the light conversion layer formed by the resin composition.

Additive (H)

The resin composition may further include an additive (H). In the present embodiment, the additive (H) may include a leveling agent. The leveling agent is not particularly limited, and suitable leveling agent may be selected according to needs. For example, the leveling agent may include a siloxane-based surfactant, a silicone-based surfactant, a fluorine-based surfactant or other suitable surfactants. The leveling agent may be used alone or in combination. However, the invention is not limited thereto, and the additive (H) may include other suitable additives. The additive (H) may be used alone or in combination.

The siloxane-based surfactant may include polysiloxane-based surfactant. For example, the siloxane-based surfactant may include BYK-307, BYK-323, BYK-348 (product name; produced by BYK Additives & Instruments), KP323, KP324, KP340, KP341 (product name; produced by Shin-Etsu Chemical Co., Ltd.) or other suitable siloxane-based surfactants. The siloxane-based surfactant may be used alone or in combination.

The silicone-based surfactant may include BYK-333 (product name; produced by BYK Additives & Instruments) or other suitable silicone-based surfactants. The silicone-based surfactant may be used alone or in combination.

The fluorine-based surfactant may include Megaface F-477, F-554, F-556, F-563, F-575, RS-72-K (product name; produced by DIC Corporation) or other suitable fluorine-based surfactants. The fluorine-based surfactant may be used alone or in combination.

Based on a total usage amount of 100 parts by weight of the resin composition, a usage amount of the additive (H) is 0.01 part by weight to 0.5 part by weight.

When the resin composition further includes the leveling agent as the additive (H), the light conversion layer formed by the resin composition may have good coating uniformity.

Preparation Method of Resin Composition

The preparation method of the resin composition is not particularly limited. For example, the quantum dot (A), the alkali-soluble resin (B), the ethylenically unsaturated monomer (C), the photoinitiator (D), the solvent (E) and the phenyl-based compound (F) were placed in a stirrer and stirred to be uniformly mixed into a solution state. If needed, the scatterer (G) and the additive (H) may also be added, and after mixing uniformly, a liquid resin composition was obtained.

Manufacturing Method of Light Conversion Layer

An exemplary embodiment of the invention provides a light conversion layer, which is formed by using the above resin composition.

The light conversion layer may be formed by coating the resin composition on a substrate to form a coating film and performing pre-bake, exposure, development, and post-bake on the coating film. For example, after the resin composition was coated on the substrate to form a coating film, the baking step before the exposure (i.e. pre-bake) was performed at a temperature of 90° C. for 120 seconds. Next, the pre-baked coating film was exposed with an high-pressure mercury lamp at 100 mJ/cm$^2$. Then, the exposed coating film was performed with a step of development for 50 seconds. Next, developed coating film was washed with distilled water and nitrogen gas was blown to dry the coating film. Then, post-bake was performed at 150° C. for 20 minutes to form a light conversion layer on the substrate.

The substrate may be a glass substrate, a plastic base material (such as a polyether sulfone (PES) board, a polycarbonate (PC) board or a polyimide (PI) board) or other transparent substrates, and the type thereof is not particularly limited.

The coating method is not particularly limited, but a spray coating method, a roll coating method, a spin coating method, or the like may be used, and in general, a spin coating method is widely used. In addition, a coating film was formed, and then, in some cases, the residual solvent may be partially removed under reduced pressure.

The developing solution is not particularly limited, and a suitable developing solution may be selected according to needs. For example, the developing solution may be potassium hydroxide (KOH) solution, and the concentration thereof may be 0.038 wt %.

In the present embodiment, the light conversion layer may further include a red pattern layer, a green pattern layer and a scatterer pattern layer. The red pattern layer includes red quantum dots. The green pattern layer includes green quantum dots. The scatterer pattern layer does not include quantum dots.

Light Emitting Device

An exemplary embodiment of the invention provides a light emitting device, which includes the above light conversion layer.

FIG. 1 is a schematic diagram of a light emitting device according to an embodiment of the invention. The light emitting device 10 includes a substrate 120, a light conversion layer 160 and a backlight module 200. In the present embodiment, the light emitting device 10 may further include a filter layer 140. The light emitting device 10 may also further include a polarizing plate, an alignment film, a liquid crystal (not shown), or other elements known to those skilled in the art, which will not be described in detail here.

In the present embodiment, the substrate 120 is a transparent substrate. The material of the substrate 120 may be glass, organic polymer (such as polyimide (PI), polyether sulfone (PES) or polycarbonate (PC)) or other suitable materials.

The filter layer 140 is located below the substrate 120. In the present embodiment, the filter layer 140 includes, for example, a red filter pattern 142, a green filter pattern 144 and a blue filter pattern 146, wherein light shielding patterns 148 are preferably provided between each filter patterns. The red filter pattern 142, the green filter pattern 144 and the blue filter pattern 146 do not include quantum dots.

The light conversion layer 160 is located below the filter layer 140. The filter layer 140 is located between the substrate 120 and the light conversion layer 160. The light conversion layer 160 is a light conversion layer formed by using the above resin composition. In the present embodiment, the light conversion layer 160 includes a red pattern layer 162, a green pattern layer 164 and a scatterer pattern layer 166, wherein bank layers 168 are preferably provided between each pattern layers. The red pattern layer 162 includes red quantum dots. The green pattern layer 164 includes green quantum dots. The scatterer pattern layer 166 does not include quantum dots. In the present embodiment, the red pattern layer 162 of the light conversion layer 160 is disposed opposite to the red filter pattern 142 of the filter layer 140, the green pattern layer 164 of the light conversion layer 160 is disposed opposite to the green filter pattern 144 of the filter layer 140, and the scatterer pattern layer 166 of the light conversion layer 160 is disposed opposite to the blue filter pattern 146 of the filter layer 140. For example, the red pattern layer 162 is located below the red filter pattern 142, the green pattern layer 164 is located below the green filter patter 144, and the scatterer pattern layer 166 is located below the blue filter pattern 146.

The backlight module 200 is disposed on a side of the substrate 120 where the light conversion layer 160 is disposed. The backlight module 200 irradiates the light conversion layer 160 with light. For example, the backlight module 200 is suitable for providing a light source, and the light emitted by the light source passes through the light conversion layer 160, the filter layer 140, and the substrate 120 sequentially to provide the converted light source. In the present embodiment, the type of the light source used in the backlight module 200 may include organic light emitting diode (OLED), micro-LED or other suitable light sources. In the present application, the backlight module 200 is a light source emitting blue light. After the blue light emitted by the backlight module 200 is absorbed by the red quantum dots in the red pattern layer 162 and the green quantum dots in the green pattern layer 164, the converted light may be emitted from the red pattern layer 162 and the green pattern layer 164, respectively; and then the converted light passes through the red filter pattern 142 and the green filter pattern 144 of the filter layer 140 to emit red light and green light, respectively; and the blue light emitted by the backlight module 200 directly passes through the scatterer pattern layer 166 without quantum dots to emit blue light, and then passes through the blue filter pattern 146 of the filter layer 140 to emit blue light. For example, when the light emitted by the light source passing through the light conversion layer 160 and the filter layer 140 includes visible light (such as red light, green light, and blue light), the light emitting device 10 may be applied to a display device or other suitable devices. Thereby, the display device including the light emitting device 10 which has the light conversion layer formed by the above resin composition may exhibit better brightness and color purity than the conventional display device. For example, when the light emitted by the light source passing through the light conversion layer 160 and the filter layer 140 includes near infrared (such as a wavelength being about 780 nm to 800 nm), the light emitting device 10 may be applied to an electromagnetic radiation device or other suitable devices.

Figure 2:
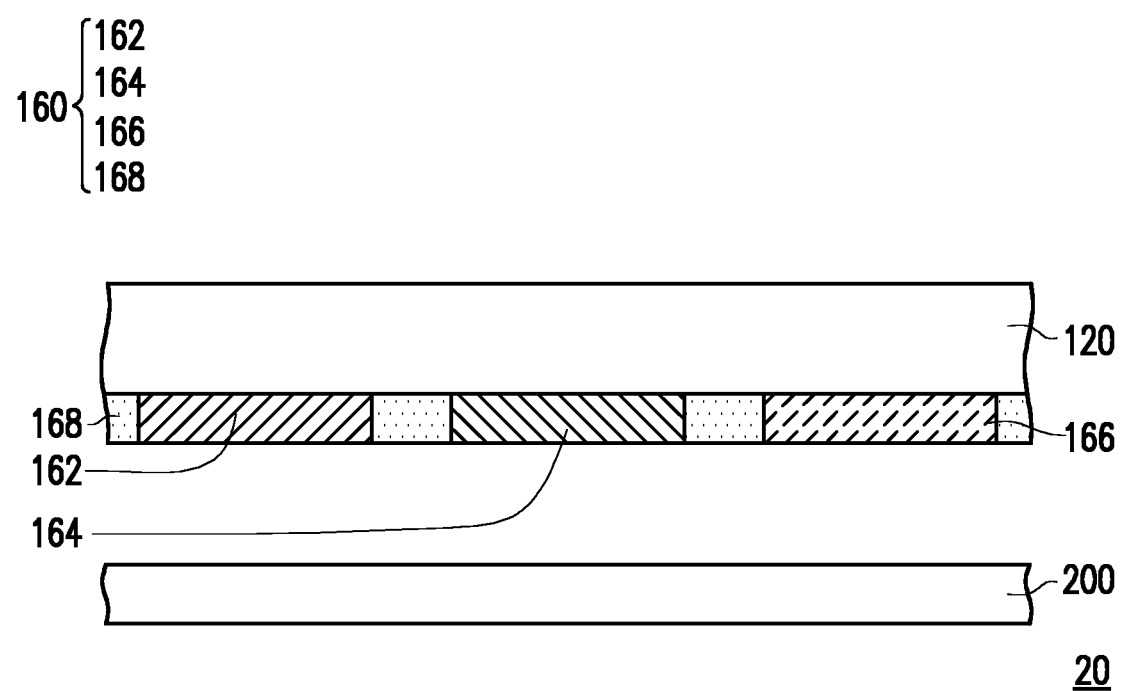
FIG. 2 is a schematic diagram of a light emitting device according to another embodiment of the invention.

FIG. 2 is a schematic diagram of a light emitting device according to another embodiment of the invention. It should be noted that the embodiment of FIG. 2 adopts the same reference numerals and parts of the embodiment of FIG. 1, wherein the same or similar reference numerals are used to denote the same or similar elements, and the same technical content is omitted. The omitted descriptions may be derived from the above embodiments and thus no repetition is incorporated herein.

The main difference between the embodiment of FIG. 2 and the embodiment of FIG. 1 is that the light emitting device 20 does not have the filter layer 140.

Referring to FIG. 2, the light emitting device 20 includes a substrate 120, a light conversion layer 160 and a backlight module 200. In the present embodiment, the light conversion layer 160 is located below the substrate 120, and the filter layer without quantum dots does not exist between the light conversion layer 160 and the substrate 120.

In the present embodiment, the light emitted by the light source provided by the backlight module 200 passes through the light conversion layer 160 and the substrate 120 sequentially to provide the converted light source. After the blue light emitted by the backlight module 200 is absorbed by the red quantum dots in the red pattern layer 162 and the green quantum dots in the green pattern layer 164, the converted light may be emitted from the red pattern layer 162 and the green pattern layer 164, respectively; and the blue light emitted by the backlight module 200 directly passes through the scatterer pattern layer 166 without quantum dots to emit blue light. For example, when the light emitted by the light source passing through the light conversion layer 160 includes visible light (such as red light, green light, and blue light), the light emitting device 20 may be applied to a display device or other suitable devices. Thereby, the display device including the light emitting device 20 may not only exhibit better brightness and color purity but also omit the step of manufacturing the filter layer to reduce the manufacturing cost of the display device than the conventional display device and/or above display device including the light emitting device 10. For example, when the light emitted by the light source passing through the light conversion layer 160 includes near infrared (such as a wavelength being about 780 nm to 800 nm), the light emitting device 20 may be applied to an electromagnetic radiation device or other suitable devices.

Hereinafter, the invention is described in detail with reference to examples. The following examples are provided to describe the invention, and the scope of the invention includes the scope in the following patent application and its substitutes and modifications, and is not limited to the scope of the examples.

Examples of Resin Composition and Light Conversion Layer

Example 1 to Example 31 and Comparative example 1 to Comparative example 16 of the resin composition and the light conversion layer are described below:

Example 1 a. Resin Composition 8 parts by weight of CdSe-based green quantum dots (produced by Taiwan Nanocrystals Inc.), 11 parts by weight of alkali-soluble resin (B-1) (produced by Miwon Commercial Co., Ltd), 5.5 parts by weight of dipentaerythritol hexaacrylate (DPHA)(produced by NIPPON KAYAKU Co., Ltd.), 0.7 part by weight of Irgacure OXE-01, 0.7 part by weight of Irgacure 907, 0.1 part by weight of Megaface F-554, 1 part by weight of Irganox 1010 (product name; produced by BASF), and 3 parts by weight of titanium dioxide dispersion (produced by Sanyo Color Works, LTD.) were added to a solvent of 70 parts by weight of propylene glycol monomethyl ether acetate (PGMEA), and after stirring uniformly with a stirrer, the resin composition of Example 1 was obtained.

b. Light Conversion Layer

Each resin composition prepared in the Examples was coated on a substrate by a spin coating method (spin coater model: MS-A150, manufactured by MIKASA Co., Ltd., rotation speed: about 200 rpm). Then, pre-bake was performed at a temperature of 90° C. for 120 seconds to form a thin film. Then, the pre-baked thin film was exposed with 100 mJ/cm2 of light from an high-pressure mercury lamp including g, h, i, i+ rays (exposure machine model: UX-1000SM-ANC01, manufactured by Ushio, Inc.) to form a semi-finished product. In the exposure step, a light mask having a linear shaped transmittance pattern and 1 μm to 100 μm of line width/spacing was used, and a distance between the light mask and the surface of the pre-baked thin film was controlled to about 50 μm. Next, development was performed at a temperature of 23° C. using KOH solution having a concentration of 0.038 wt % as a developing solution for 50 seconds. Then, the developed coating film was washed with distilled water and nitrogen gas was blown to dry the coating film. Next, post-bake was performed at 150° C. for 20 minutes to obtain a light conversion layer having a pattern thickness of 6 μm. The obtained light conversion layers were evaluated by each of the following evaluation methods, and the results thereof are as shown in Table 2.

Example 2 to Example 31 and Comparative Example 1 to Comparative Example 16

The resin compositions of Example 2 to Example 31 and Comparative example 1 to Comparative example 16 were prepared using the same steps as Example 1, and the difference thereof is: the type and the usage amount of the components of the resin compositions were changed (as shown in Table 2), wherein the components/compounds corresponding to the symbols in Table 2 are shown in Table 1. The obtained resin compositions were made into light conversion layers and evaluated by each of the following evaluation methods, and the results thereof are as shown in Table 2.

TABLE 1

| | Symbol | Components/compound |
|---|---|---|
| Quantum dot (A) | A-1 | CdSe-based green quantum dots (produced by Taiwan Nanocrystals Inc.) |
| | A-2 | CdSe-based red quantum dots (produced by Taiwan Nanocrystals Inc.) |
| | A-3 | InP-based green quantum dots (produced by Suzhou Xingshuo Nanotech Co., Ltd.). |
| | A-4 | InP-based red quantum dots (produced by Suzhou Xingshuo Nanotech Co., Ltd.) |
| Alkali-soluble resin (B) | B-1 | Alkali-soluble resin (B-1) (produced by Miwon Commercial Co., Ltd) |
| | B-2 | Alkali-soluble resin (B-2) (produced by Miwon Commercial Co., Ltd) |
| Ethylenically unsaturated monomer (C) | C-1 | Dipentaerythritol hexaacrylate (produced by NIPPON KAYAKU Co., Ltd.) |
| Photoinitiator (D) | D-1 | Irgacure OXE-01 (produced by BASF) |
| | D-2 | Irgacure 907 (produced by BASF) |
| Solvent (E) | E-1 | Propylene glycol monomethyl ether acetate |

TABLE 1-continued
| Symbol | | Components/compound |
|---|---|---|
| Phenyl-based compound (F) | F-1 | Irganox 1010 (produced by BASF) |
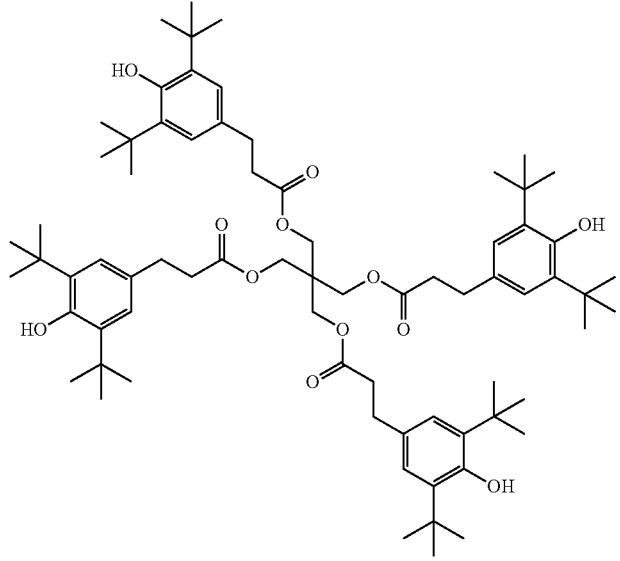
Formula (f-1)
| | F-2 | Irganox 1035 (produced by BASF) |
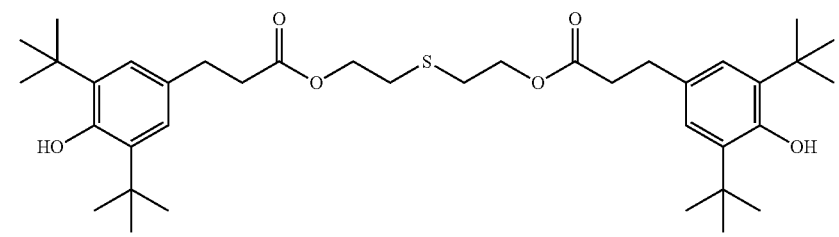
Formula (f-2)
| | F-3 | CHINOX N445 (produced by Double Bond Chemical Ind. Co., Ltd.) |
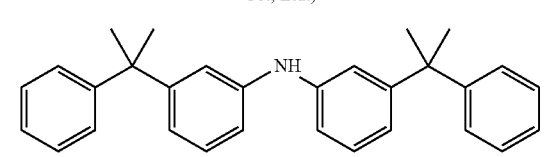
Formula (f-14)
| | F-4 | CHINOX F57 (produced by Double Bond Chemical Ind. Co., Ltd.) |
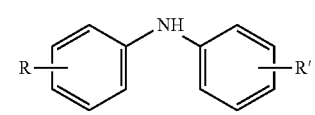
(R and R' are each hydrogen, $C_4H_9$ or $C_8H_{17}$) mixture TABLE 1-continued

| Symbol | Components/compound |
|---|---|
| F-5 | Irgafos 168 (produced by BASF) |

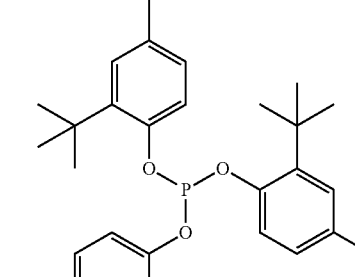

| | | |
|---|---|---|
| | F-6 | Irgafos PS 802 (produced by BASF) |

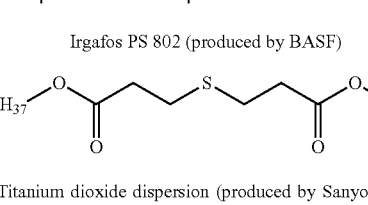

| Scatterer (G) | G-1 | Titanium dioxide dispersion (produced by Sanyo Color Works, LTD.) |
|---|---|---|
| Additive (H) | H-1 | Megaface F-554 (product name; produced by DIC Corporation) |

TABLE 2

| Component | | Examples | | | | | | | | | | |
|---|---|---|---|---|---|---|---|---|---|---|---|---|
| (unit: parts by weight) | | 1 | 2 | 3 | 4 | 5 | 6 | 7 | 8 | 9 | 10 | 11 |
| Quantum dot (A) | A-1 | 8 | 8 | 8 | 8 | 8 | 8 | 8 | 8 | 8 | 8 | — |
| | A-2 | — | — | — | — | — | — | — | — | — | — | 8 |
| | A-3 | — | — | — | — | — | — | — | — | — | — | — |
| | A-4 | — | — | — | — | — | — | — | — | — | — | — |
| Alkali-soluble resin (B) | B-1 | 11 | 11.5 | 10 | — | 11 | 11 | 11 | 11 | 11 | 11 | 11 |
| | B-2 | — | — | — | 11 | — | — | — | — | — | — | — |
| Ethylenically unsaturated monomer (C) | C-1 | 5.5 | 5.5 | 4.5 | 5.5 | 5.5 | 5.5 | 5.5 | 5.5 | 5.5 | 5.5 | 5.5 |
| Photoinitiator (D) | D-1 | 0.7 | 0.7 | 0.7 | 0.7 | 0.7 | 0.7 | 0.7 | 0.7 | 0.7 | 0.7 | 0.7 |
| | D-2 | 0.7 | 0.7 | 0.7 | 0.7 | 0.7 | 0.7 | 0.7 | 0.7 | 0.7 | 0.7 | 0.7 |
| Solvent (E) | E-1 | 70 | 70 | 70 | 70 | 70 | 70 | 70 | 70 | 70 | 70 | 70 |
| Phenyl-based compound (F) | F-1 | 1 | 0.5 | 3 | 1 | — | — | — | 0.5 | — | 0.25 | 1 |
| | F-2 | — | — | — | — | 1 | — | — | 0.5 | — | 0.25 | — |
| | F-3 | — | — | — | — | — | 1 | — | — | 0.5 | 0.25 | — |
| | F-4 | — | — | — | — | — | — | 1 | — | 0.5 | 0.25 | — |
| | F-5 | — | — | — | — | — | — | — | — | — | — | — |
| | F-6 | — | — | — | — | — | — | — | — | — | — | — |
| Scatterer (G) | G-1 | 3 | 3 | 3 | 3 | 3 | 3 | 3 | 3 | 3 | 3 | 3 |
| Additive (H) | H-1 | 0.1 | 0.1 | 0.1 | 0.1 | 0.1 | 0.1 | 0.1 | 0.1 | 0.1 | 0.1 | 0.1 |
| Evaluation results | Viscosity stability | ◎ | ◎ | ◎ | ◎ | ◎ | ◎ | ◎ | ◎ | ◎ | ◎ | ◎ |
| | Patterning ability | ◎ | ◎ | ◎ | ◎ | ◎ | ◎ | ◎ | ◎ | ◎ | ◎ | ◎ |
| | Pattern stability | ◎ | ◎ | ◎ | ◎ | ◎ | ◎ | ◎ | ◎ | ◎ | ◎ | ◎ |

| Component | | Examples | | | | | | | | |
|---|---|---|---|---|---|---|---|---|---|---|
| (unit: parts by weight) | | 12 | 13 | 14 | 15 | 16 | 17 | 18 | 19 | 20 |
| Quantum dot (A) | A-1 | — | — | — | — | — | — | — | — | — |
| | A-2 | 8 | 8 | 8 | 8 | 8 | 8 | — | — | — |
| | A-3 | — | — | — | — | — | — | 8 | 8 | 8 |
| | A-4 | — | — | — | — | — | — | — | — | — |

TABLE 2-continued

| | | | | | | | | | | |
|---|---|---|---|---|---|---|---|---|---|---|
| Alkali-soluble resin(B) | B-1 | 11 | 11 | 11 | 11 | 11 | 11 | 11 | 11 | 11 |
| | B-2 | — | — | — | — | — | — | — | — | — |
| Ethylenically unsaturated monomer (C) | C-1 | 5.5 | 5.5 | 5.5 | 5.5 | 5.5 | 5.5 | 5.5 | 5.5 | 5.5 |
| Photoinitiator (D) | D-1 | 0.7 | 0.7 | 0.7 | 0.7 | 0.7 | 0.7 | 0.7 | 0.7 | 0.7 |
| | D-2 | 0.7 | 0.7 | 0.7 | 0.7 | 0.7 | 0.7 | 0.7 | 0.7 | 0.7 |
| Solvent (E) | E-1 | 70 | 70 | 70 | 70 | 70 | 70 | 70 | 70 | 70 |
| Phenyl-based compound (F) | F-1 | — | — | — | 0.5 | — | 0.25 | 1 | — | — |
| | F-2 | 1 | — | — | 0.5 | — | 0.25 | — | 1 | — |
| | F-3 | — | 1 | — | — | 0.5 | 0.25 | — | — | 1 |
| | F-4 | — | — | 1 | — | 0.5 | 0.25 | — | — | — |
| | F-5 | — | — | — | — | — | — | — | — | — |
| | F-6 | — | — | — | — | — | — | — | — | — |
| Scatterer (G) | G-1 | 3 | 3 | 3 | 3 | 3 | 3 | 3 | 3 | 3 |
| Additive (H) | H-1 | 0.1 | 0.1 | 0.1 | 0.1 | 0.1 | 0.1 | 0.1 | 0.1 | 0.1 |
| Evaluation results | Viscosity stability | ◎ | ◎ | ◎ | ◎ | ◎ | ◎ | ◎ | ◎ | ◎ |
| | Patterning ability | ◎ | ◎ | ◎ | ◎ | ◎ | ◎ | ◎ | ◎ | ◎ |
| | Pattern stability | ◎ | ◎ | ◎ | ◎ | ◎ | ◎ | ◎ | ◎ | ◎ |

| Component | | Examples | | | | | | | | |
|---|---|---|---|---|---|---|---|---|---|---|
| (unit: parts by weight) | | 21 | 22 | 23 | 24 | 25 | 26 | 27 | 28 | 29 |
| Quantum dot (A) | A-1 | — | — | — | — | — | — | — | — | — |
| | A-2 | — | — | — | — | — | — | — | — | — |
| | A-3 | 8 | 8 | 8 | 8 | — | — | — | — | — |
| | A-4 | — | — | — | — | 8 | 8 | 8 | 8 | 8 |
| Alkali-soluble resin (B) | B-1 | 11 | 11 | 11 | 11 | 11 | 11 | 11 | 11 | 11 |
| | B-2 | — | — | — | — | — | — | — | — | — |
| Ethylenically unsaturated monomer (C) | C-1 | 5.5 | 5.5 | 5.5 | 5.5 | 5.5 | 5.5 | 5.5 | 5.5 | 5.5 |
| Photoinitiator (D) | D-1 | 0.7 | 0.7 | 0.7 | 0.7 | 0.7 | 0.7 | 0.7 | 0.7 | 0.7 |
| | D-2 | 0.7 | 0.7 | 0.7 | 0.7 | 0.7 | 0.7 | 0.7 | 0.7 | 0.7 |
| Solvent (E) | E-1 | 70 | 70 | 70 | 70 | 70 | 70 | 70 | 70 | 70 |
| Phenyl-based compound (F) | F-1 | — | 0.5 | — | 0.25 | 1 | — | — | — | 0.5 |
| | F-2 | — | 0.5 | — | 0.25 | — | 1 | — | — | 0.5 |
| | F-3 | — | — | 0.5 | 0.25 | — | — | 1 | — | — |
| | F-4 | 1 | — | 0.5 | 0.25 | — | — | — | 1 | — |
| | F-5 | — | — | — | — | — | — | — | — | — |
| | F-6 | — | — | — | — | — | — | — | — | — |
| Scatterer (G) | G-1 | 3 | 3 | 3 | 3 | 3 | 3 | 3 | 3 | 3 |
| Additive (H) | H-1 | 0.1 | 0.1 | 0.1 | 0.1 | 0.1 | 0.1 | 0.1 | 0.1 | 0.1 |
| Evaluation results | Viscosity stability | ◎ | ◎ | ◎ | ◎ | ◎ | ◎ | ◎ | ◎ | ◎ |
| | Patterning ability | ◎ | ◎ | ◎ | ◎ | ◎ | ◎ | ◎ | ◎ | ◎ |
| | Pattern stability | ◎ | ◎ | ◎ | ◎ | ◎ | ◎ | ◎ | ◎ | ◎ |

| Component | | Examples | | Comparative examples | | | | | | |
|---|---|---|---|---|---|---|---|---|---|---|
| (unit: parts by weight) | | 30 | 31 | 1 | 2 | 3 | 4 | 5 | 6 | 7 |
| Quantum dot (A) | A-1 | — | — | 8 | 8 | 8 | 8 | — | — | — |
| | A-2 | — | — | — | — | — | — | 8 | 8 | 8 |
| | A-3 | — | — | — | — | — | — | — | — | — |
| | A-4 | 8 | 8 | — | — | — | — | — | — | — |
| Alkali-soluble resin (B) | B-1 | 11 | 11 | 11 | 7 | 11 | 11 | 11 | 7 | 11 |
| | B-2 | — | — | — | — | — | — | — | — | — |
| Ethylenically unsaturated monomer (C) | C-1 | 5.5 | 5.5 | 6.5 | 4.5 | 5.5 | 5.5 | 6.5 | 4.5 | 5.5 |
| Photoinitiator (D) | D-1 | 0.7 | 0.7 | 0.7 | 0.7 | 0.7 | 0.7 | 0.7 | 0.7 | 0.7 |
| | D-2 | 0.7 | 0.7 | 0.7 | 0.7 | 0.7 | 0.7 | 0.7 | 0.7 | 0.7 |
| Solvent (E) | E-1 | 70 | 70 | 70 | 70 | 70 | 70 | 70 | 70 | 70 |
| Phenyl-based compound (F) | F-1 | — | 0.25 | — | 3 | — | — | — | 3 | — |
| | F-2 | — | 0.25 | — | 3 | — | — | — | 3 | — |
| | F-3 | 0.5 | 0.25 | — | — | — | — | — | — | — |
| | F-4 | 0.5 | 0.25 | — | — | — | — | — | — | — |
| | F-5 | — | — | — | — | 1 | — | — | — | 1 |
| | F-6 | — | — | — | — | — | 1 | — | — | — |

TABLE 2-continued

| | | | | | | | | | | |
|---|---|---|---|---|---|---|---|---|---|---|
| Scatterer (G) | G-1 | 3 | 3 | 3 | 3 | 3 | 3 | 3 | 3 | 3 |
| Additive (H) | H-1 | 0.1 | 0.1 | 0.1 | 0.1 | 0.1 | 0.1 | 0.1 | 0.1 | 0.1 |
| Evaluation results | Viscosity stability | ◎ | ◎ | X | ◎ | X | X | X | ◎ | X |
| | Patterning ability | ◎ | ◎ | ○ | X | X | X | ○ | X | X |
| | Pattern stability | ◎ | ◎ | X | X | X | X | X | X | X |

| Component | | Comparative examples | | | | | | | | |
|---|---|---|---|---|---|---|---|---|---|---|
| (unit: parts by weight) | | 8 | 9 | 10 | 11 | 12 | 13 | 14 | 15 | 16 |
| Quantum dot (A) | A-1 | — | — | — | — | — | — | — | — | — |
| | A-2 | 8 | — | — | — | — | — | — | — | — |
| | A-3 | — | 8 | 8 | 8 | 8 | — | — | — | — |
| | A-4 | — | — | — | — | — | 8 | 8 | 8 | 8 |
| Alkali-soluble resin (B) | B-1 | 11 | 11 | 7 | 11 | 11 | 11 | 7 | 11 | 11 |
| | B-2 | — | — | — | — | — | — | — | — | — |
| Ethylenically unsaturated monomer (C) | C-1 | 5.5 | 6.5 | 4.5 | 5.5 | 5.5 | 6.5 | 4.5 | 5.5 | 5.5 |
| Photoinitiator (D) | D-1 | 0.7 | 0.7 | 0.7 | 0.7 | 0.7 | 0.7 | 0.7 | 0.7 | 0.7 |
| | D-2 | 0.7 | 0.7 | 0.7 | 0.7 | 0.7 | 0.7 | 0.7 | 0.7 | 0.7 |
| Solvent (E) | E-1 | 70 | 70 | 70 | 70 | 70 | 70 | 70 | 70 | 70 |
| Phenyl-based compound (F) | F-1 | — | — | 3 | — | — | — | 3 | — | — |
| | F-2 | — | — | 3 | — | — | — | 3 | — | — |
| | F-3 | — | — | — | — | — | — | — | — | — |
| | F-4 | — | — | — | — | — | — | — | — | — |
| | F-5 | — | — | — | 1 | — | — | — | 1 | — |
| | F-6 | 1 | — | — | — | 1 | — | — | — | 1 |
| Scatterer (G) | G-1 | 3 | 3 | 3 | 3 | 3 | 3 | 3 | 3 | 3 |
| Additive (H) | H-1 | 0.1 | 0.1 | 0.1 | 0.1 | 0.1 | 0.1 | 0.1 | 0.1 | 0.1 |
| Evaluation results | Viscosity stability | X | X | ◎ | X | X | X | ◎ | X | X |
| | Patterning ability | X | ○ | X | X | X | ○ | X | X | X |
| | Pattern stability | X | X | X | X | X | X | X | X | X |

Evaluation Methods a. Viscosity Stability

The viscosity (initial viscosity) of the resin composition prepared in each example and comparative example was measured by a viscometer (model: TV-22, manufactured by Toki Sangyo Co., Ltd). After storing the resin composition at room temperature for three weeks, the respective viscosities thereof were measured again. The viscosity change rate is calculated according to the following formula:

$$\text{Viscosity change rate (\%)} = \frac{\text{Viscosity after 3 weeks} - \text{Initial viscosity}}{\text{Initial viscosity}} \times 100\%$$

The evaluation criteria of viscosity stability are as follows:
◎: viscosity change rate≤5%;
○: 5%<viscosity change rate<15%;
X: 15%≤viscosity change rate.

b. Patterning Ability

The prepared light conversion layer was observed whether the straight line pattern with a line width of 10 μm remains neat and whether there is a resin composition remaining on the edge of the pattern on the substrate via an electron microscope (Model: SU8000, manufactured by HITACHI) at a magnification of 10000 to evaluate patterning ability.

The evaluation criteria of patterning ability are as follows:
◎: the linearity of the line edge of the straight line pattern is high, and there is no resin composition remaining on the edge of the pattern on the substrate;
○: the line edge of the straight line pattern is not straight, and there is a little resin composition remaining on the edge of the pattern on the substrate;
X: the line edge of the straight line pattern is not straight, and there is a great deal of resin composition remaining on the edge of the pattern on the substrate or the pattern is peeled off from the substrate.

c. Pattern Stability

After storing the resin composition at room temperature for three weeks, a light conversion layer is prepared by the resin composition again. And the pattern stability is evaluated by the above method of evaluating the patterning ability.

The evaluation criteria of pattern stability are as follows:
◎: the linearity of the line edge of the straight line pattern is high, and there is no resin composition remaining on the edge of the pattern on the substrate;
○: the line edge of the straight line pattern is not straight, and there is a little resin composition remaining on the edge of the pattern on the substrate;
X: the line edge of the straight line pattern is not straight, and there is a great deal of resin composition remaining on the edge of the pattern on the substrate or the pattern is peeled off from the substrate.

Evaluation Results

As may be seen from Table 2, the resin composition containing the phenyl-based compound (F) having specific structure, and based on a total usage amount of 100 parts by weight of the resin composition, the usage amount of the phenyl-based compound (F) being 0.05 part by weight to 5 parts by weight (Examples 1 to 31) has good viscosity stability and patterning ability, and a light conversion layer formed thereof has good resolution and pattern stability, and may be applied to a light emitting device. On the other hand, the viscosity stability, patterning ability or pattern stability of the resin composition containing the phenyl-based compound (F) without specific structure or the usage amount out of the above range (Comparative examples 1 to 16) and a light conversion layer formed thereof are not good.

The resin composition containing the phenyl-based compound (F) having specific structure (Examples 1 to 31 and Comparative examples 2, 6, 10, 14) has good viscosity stability. However, when the usage amount of the phenyl-based compound (F) having specific structure in the resin composition is out of the above range, it may affect the reaction between other components in the resin composition (such as free radicals generated by the photoinitiator reacting with the ethylenically unsaturated monomer), thereby causing the poor patterning ability of the resin composition, and the resolution and pattern stability of a light conversion layer formed thereof are not good (Comparative examples 2, 6, 10, 14). Therefore, when the phenyl-based compound (F) having specific structure is used and the usage amount thereof is within the above range, the resin composition has both good viscosity stability and patterning ability, and a light conversion layer formed thereof has good resolution and pattern stability, and may be applied to a light emitting device.

In addition, when a resin composition does not contain a phenyl-based compound, it means that the resin composition does not have a group capable of efficiently reacting with free radicals, and thus the free radicals may react with other components in the resin composition, thereby causing the poor viscosity stability of the resin composition at room temperature, and the pattern stability of a light conversion layer formed thereof is not good (Comparative examples 1, 5, 9, 13).

In addition, when a resin composition does not contain a phenyl-based compound having the above specific structure, it means that the resin composition does not have a group capable of efficiently reacting with free radicals, and thus the free radicals may react with other components in the resin composition, thereby causing the poor viscosity stability of the resin composition at room temperature, and the pattern stability of a light conversion layer formed thereof is not good (Comparative examples 3, 4, 7, 8, 11, 12, 15, 16). In addition, when a resin composition contains a phosphorus or sulfur-containing phenyl-based compound, the patterning ability of the resin composition is not good and the resolution of the light conversion layer formed thereof is not good (Comparative examples 3, 4, 7, 8, 11, 12, 15, 16) because the compatibility of the phosphorus or sulfur-containing phenyl-based compound with the resin composition may be poor.

Based on the above, the resin composition of the invention contains the phenyl-based compound (F) having specific structure and based on a total usage amount of 100 parts by weight of the resin composition, when the usage amount of the phenyl-based compound (F) is 0.05 part by weight to 5 parts by weight, the resin composition has good viscosity stability and patterning ability, and the light conversion layer formed thereof has good resolution and pattern stability, and may be applied to a light emitting device and may improve the performance of the light emitting device.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A resin composition, comprising:
a quantum dot (A);
an alkali-soluble resin (B);
an ethylenically unsaturated monomer (C);
a photoinitiator (D);
a solvent (E); and
a phenyl-based compound (F),
wherein the phenyl-based compound (F) comprises at least one of a compound represented by following Formula (F-1) and a compound represented by following Formula (F-2),

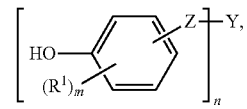

Formula (F-1)

in Formula (F-1), $R^1$ is an alkyl group, m is an integer of 0 to 3,
Z is an alkylene group,

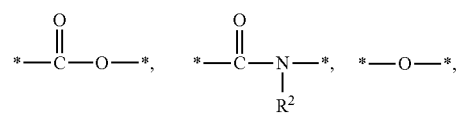

or a combination thereof, $R^2$ is a hydrogen or an alkyl group,
when n is 1, Y is a hydrogen or an alkyl group,
when n is 2, Y is a single bond, an alkylene group, S,

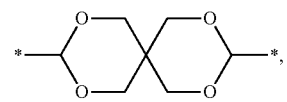

or a combination thereof,
when n is 3, Y is a single bond, a trivalent alkyl group, a trivalent phenyl group,

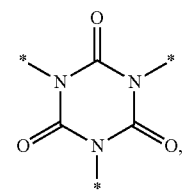 [SMILES: *n1c(=O)n(*)c(=O)n(*)c1=O]

or a combination thereof, when n is 4, Y is a carbon,

* indicates a bonding position;

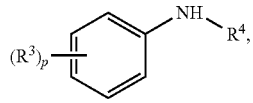
Formula (F-2)

in Formula (F-2), $R^3$ is an alkyl group, $R^4$ is a hydrogen or a phenyl group, p is 0 or 1, and based on a total usage amount of 100 parts by weight of the resin composition, a usage amount of the phenyl-based compound (F) is 0.05 part by weight to 5 parts by weight.

2. The resin composition of claim 1, wherein the quantum dot (A) comprises at least one selected from the group consisting of green quantum dots and red quantum dots, wherein a light emission wavelength of the green quantum dots is in the range of greater than or equal to 500 nm to less than 600 nm, a light emission wavelength of the red quantum dots is in the range of greater than or equal to 600 nm to less than or equal to 800 nm.

3. The resin composition of claim 1, wherein the phenyl-based compound (F) comprises at least one selected from the group consisting of following compounds:

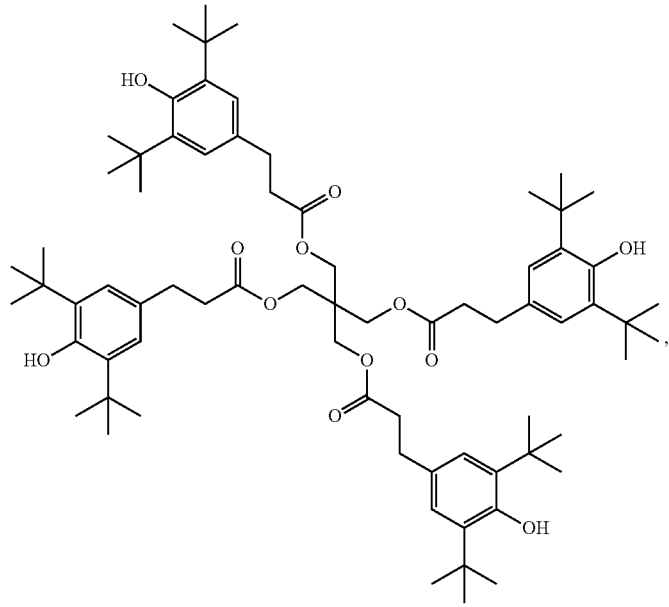
Formula (f-1)

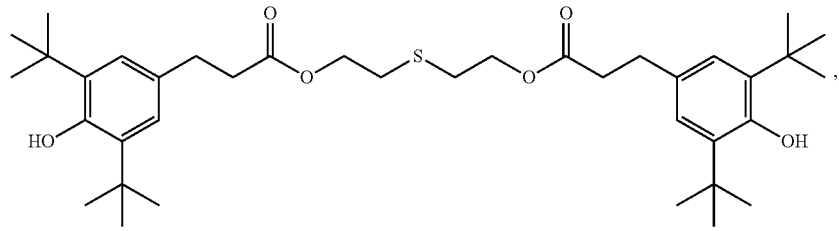
Formula (f-2)

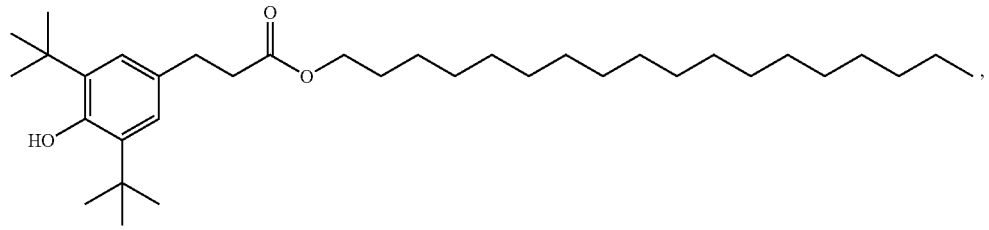
Formula (f-3)

Formula (f-4)
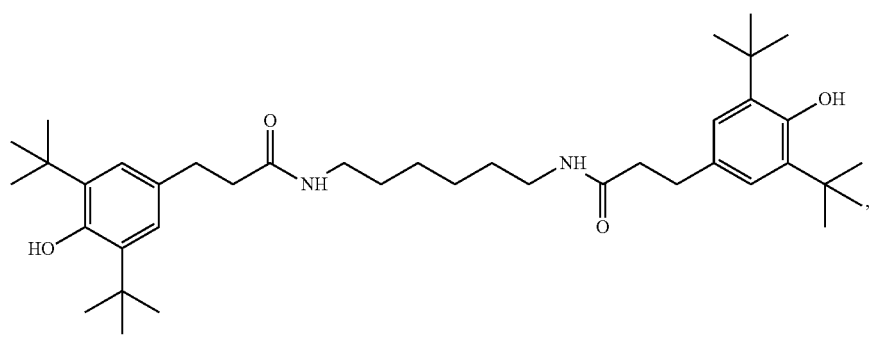
Formula (f-5)
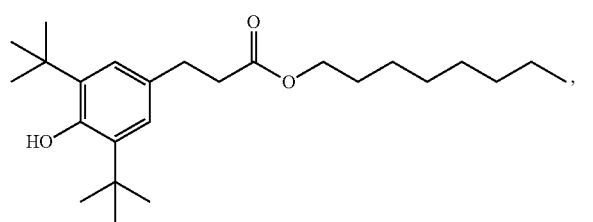
Formula (f-6)
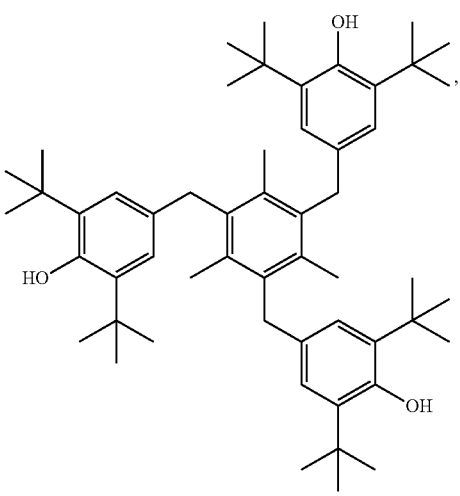
Formula (f-7)
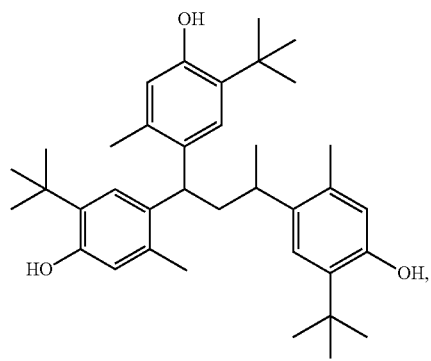
Formula (f-8)
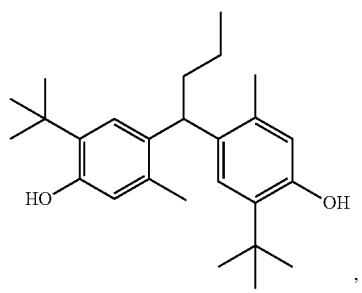

Formula (f-9)
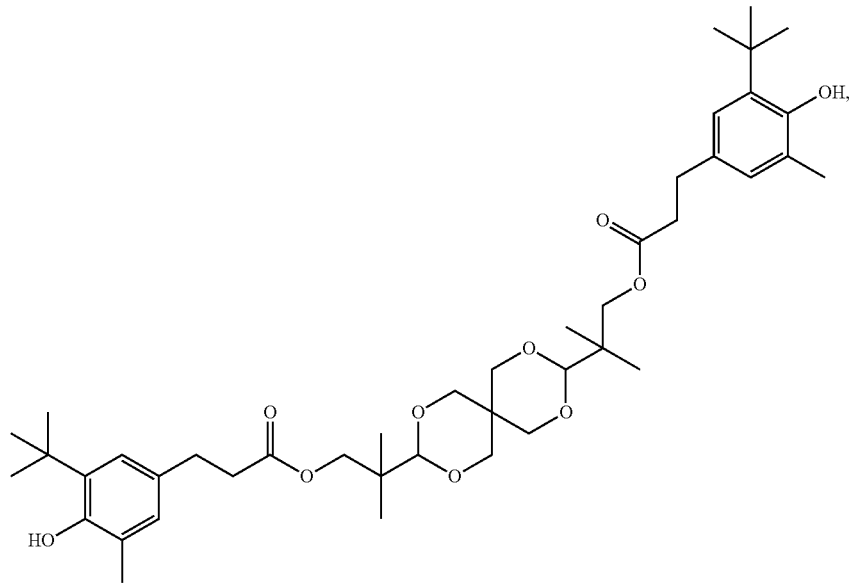
Formula (f-10)
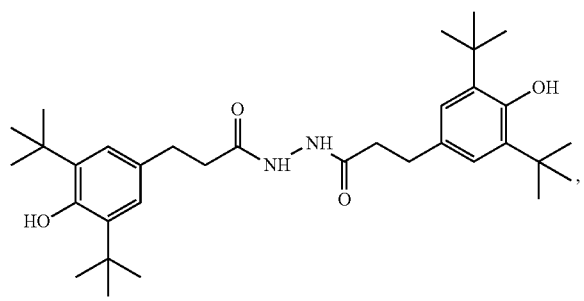
Formula (f-11)
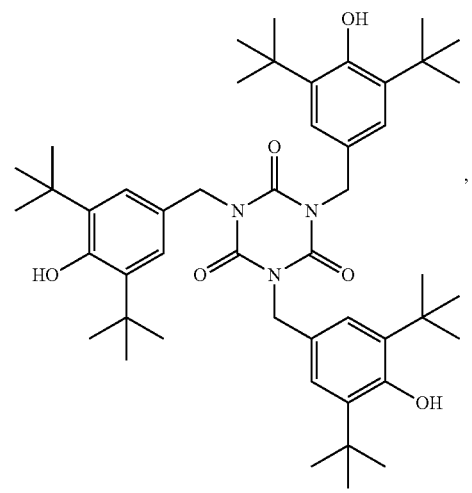
Formula (f-12)
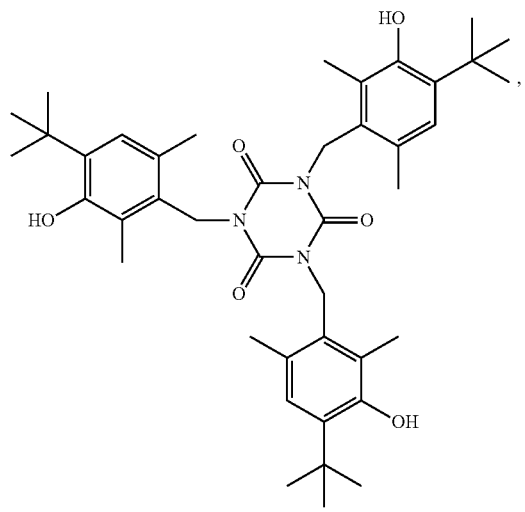

Formula (f-13)

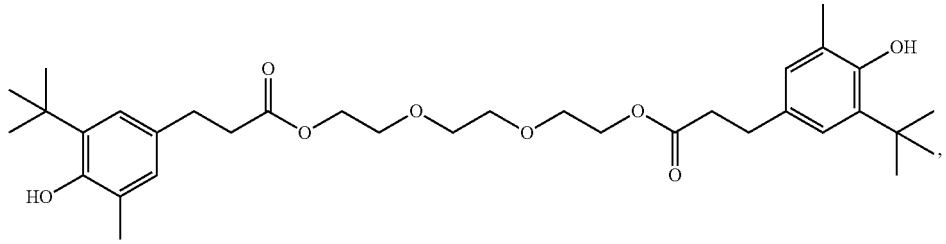

Formula (f-14)

Formula (f-15)

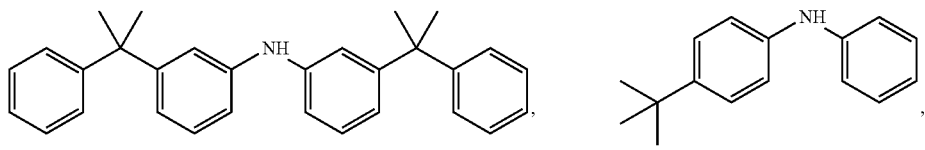

Formula (f-16)

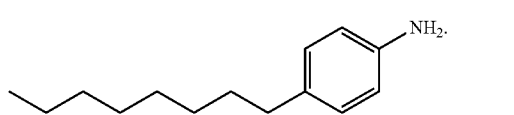

4. The resin composition of claim 1, wherein the resin composition further comprises a scatterer (G), wherein based on a total usage amount of 100 parts by weight of the resin composition, a usage amount of the scatterer (G) is 0.1 part by weight to 10 parts by weight.

5. The resin composition of claim 1, wherein the resin composition further comprises a scatterer (G), wherein the scatterer (G) comprises at least one selected from the group consisting of titanium dioxide, silicon dioxide, barium titanate, zirconium oxide, zinc oxide and aluminum oxide.

6. The resin composition of claim 1, wherein based on a total usage amount of 100 parts by weight of the resin composition, a usage amount of the quantum dot (A) is 0.5 part by weight to 15 parts by weight, a usage amount of the alkali-soluble resin (B) is 0.5 part by weight to 20 parts by weight, a usage amount of the ethylenically unsaturated monomer (C) is 0.5 part by weight to 20 parts by weight, and a usage amount of the photoinitiator (D) is 0.01 part by weight to 5 parts by weight.

7. The resin composition of claim 1, wherein based on a total usage amount of 100 parts by weight of the resin composition, a usage amount of the solvent (E) is 65 parts by weight to 85 parts by weight.

8. A light conversion layer formed by the resin composition of claim 1.

9. The light conversion layer of claim 8, wherein the light conversion layer further comprises:
   a red pattern layer containing red quantum dots;
   a green pattern layer containing green quantum dots; and
   a scatterer pattern layer, which does not contain quantum dots.

10. The light conversion layer of claim 9, wherein a light emission wavelength of the green quantum dots is in the range of greater than or equal to 500 nm to less than 600 nm, a light emission wavelength of the red quantum dots is in the range of greater than or equal to 600 nm to less than or equal to 800 nm.

11. A light emitting device comprising the light conversion layer of claim 8.

12. The light emitting device of claim 11, wherein the light emitting device further comprises:
   a substrate, wherein the light conversion layer is located on the substrate; and
   a backlight module, disposed on a side of the substrate where the light conversion layer is disposed.

13. The light emitting device of claim 12, wherein the light emitting device further comprises a filter layer located between the substrate and the light conversion layer, and the filter layer comprises a red filter pattern, a green filter pattern and a blue filter pattern, the red filter pattern, the green filter pattern and the blue filter pattern do not contain quantum dots.

* * * * *